US011240717B2

United States Patent
Jung et al.

(10) Patent No.: US 11,240,717 B2
(45) Date of Patent: Feb. 1, 2022

(54) METHOD AND APPARATUS FOR PERFORMING CELL RESELECTION IN WIRELESS COMMUNICATION SYSTEM

(71) Applicant: Samsung Electronics Co., Ltd., Suwon-si (KR)

(72) Inventors: Byounghoon Jung, Suwon-si (KR); Anil Agiwal, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 21 days.

(21) Appl. No.: 16/375,450

(22) Filed: Apr. 4, 2019

(65) Prior Publication Data

US 2019/0313303 A1 Oct. 10, 2019

(30) Foreign Application Priority Data

Apr. 4, 2018 (KR) .................. 10-2018-0039405

(51) Int. Cl.
*H04W 36/00* (2009.01)
*H04W 36/30* (2009.01)
(Continued)

(52) U.S. Cl.
CPC . *H04W 36/00835* (2018.08); *H04W 36/0077* (2013.01); *H04W 36/08* (2013.01);
(Continued)

(58) Field of Classification Search
CPC .......... H04W 36/00835; H04W 36/30; H04W 36/08; H04W 76/28; H04W 36/16;
(Continued)

(56) References Cited

U.S. PATENT DOCUMENTS

2006/0258386 A1 11/2006 Jeong et al.
2009/0221304 A1* 9/2009 Pudney ................. H04W 68/00
455/458
(Continued)

FOREIGN PATENT DOCUMENTS

WO 2004/015903 A2 2/2004
WO 2008/112255 A2 9/2008
(Continued)

OTHER PUBLICATIONS

Tang, "Cell search method and terminal device", Aug. 1, 2019, WIPO, WO 2019144417 English language translation. (Year: 2019).*

(Continued)

*Primary Examiner* — Michael K Phillips

(57) ABSTRACT

The disclosure relates to a pre-$5^{th}$-Generation (5G) or 5G communication system is provided for supporting higher data rates Beyond $4^{th}$-Generation (4G) communication such as Long Term Evolution (LTE). The disclosure provides a method and apparatus for effectively performing cell reselection in a wireless communication system. The disclosure relates to an operation method for a terminal in a wireless communication system, and the method includes determining to initiate a cell reselection in a radio resource control inactive state (RRC_Inactive state), discovering for a first cell that satisfies a first condition and a second condition, among a plurality of neighboring cells, if the first cell is discovered, camping on the first cell, and if the first cell is not discovered, camping on a second cell that satisfies the first condition and does not satisfy the second condition, among the plurality of neighboring cells, wherein the terminal is in the RRC_Inactive state.

22 Claims, 19 Drawing Sheets

(51) Int. Cl.
*H04W 36/08* (2009.01)
*H04W 76/28* (2018.01)
*H04W 36/16* (2009.01)
*H04W 76/27* (2018.01)

(52) U.S. Cl.
CPC ........... *H04W 36/16* (2013.01); *H04W 36/30* (2013.01); *H04W 76/27* (2018.02); *H04W 76/28* (2018.02)

(58) Field of Classification Search
CPC ... H04W 76/27; H04W 36/0077; H04W 4/70; H04W 48/16; H04W 36/0088; H04W 48/02
See application file for complete search history.

(56) References Cited

U.S. PATENT DOCUMENTS

| | | | |
|---|---|---|---|
| 2015/0351020 A1* | 12/2015 | Lin | H04W 4/90 455/404.1 |
| 2016/0205630 A1* | 7/2016 | Chen | H04W 48/02 455/574 |
| 2017/0055312 A1 | 2/2017 | Pinheiro et al. | |
| 2017/0265133 A1 | 9/2017 | Chandramouli et al. | |
| 2019/0044639 A1* | 2/2019 | Ouchi | H04J 11/0073 |
| 2019/0319686 A1* | 10/2019 | Chen, IV | H04W 72/046 |
| 2019/0394698 A1* | 12/2019 | Jeong | H04W 68/005 |
| 2020/0162976 A1* | 5/2020 | Yang | H04W 76/27 |

FOREIGN PATENT DOCUMENTS

| | | | |
|---|---|---|---|
| WO | 2014/023230 A1 | 2/2014 | |
| WO | 2016/107887 A1 | 7/2016 | |
| WO | WO-2019144417 A1 * | 8/2019 | ............ H04W 52/02 |
| WO | WO-2019194518 A1 * | 10/2019 | ............ H04W 24/10 |

OTHER PUBLICATIONS

Ericsson, "Introduction of late drop NGEN-DC, NE_DC and NR-DC", Feb. 25, 2018-Mar. 1, 2018, 3GPP, 3GPP TSG-RAN2 Meeting #105, Athens, Greece, R2-19xxxxxx (Year: 2018).*
3GPP, "3rd Gen. Part. Proj.; Tech. Spec. Group Radio Access Network; NR; (UE) procedures in Idle mode and RRC Inactive state (Release 15)" (Pres, of Spec./Report to TSG: TS 38.304, V 1.0.0 by Qualcomm), Mar. 19-22, 2018, 3GPP, 3GPP TSG-RAN Meeting #79, Chennai, India, Mar. 19-22, 2018, RP-180451 (Year: 2018).*
International Search Report dated Jul. 11, 2019 in connection with International Patent Application No. PCT/KR2019/003856, 4 pages.
Written Opinion of the International Searching Authority dated Jul. 11, 2019 in connection with International Patent Application No. PCT/KR2019/003856, 4 pages.

* cited by examiner

METHOD AND APPARATUS FOR PERFORMING CELL RESELECTION IN WIRELESS COMMUNICATION SYSTEM

CROSS-REFERENCE TO RELATED APPLICATION

This application is based on and claims priority under 35 U.S.C. 119 to Korean Patent Application No. 10-2018-0039405, filed on Apr. 4, 2018, in the Korean Intellectual Property Office, the disclosure of which is herein incorporated by reference in their entirety.

BACKGROUND

1. Field

The disclosure relates to a wireless communication system, and more particularly to methods and apparatus for performing a cell reselection in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and apparatus for effectively performing a cell reselection in a wireless communication system.

In accordance with an aspect of the disclosure, there is provided an operation method for a terminal in a wireless communication system, the method including determining to initiate a cell reselection in a radio resource control inactive state (RRC_Inactive state), discovering for a first cell that satisfies a first condition and a second condition, among a plurality of neighboring cells, if the first cell is discovered, camping on the first cell, and if the first cell is not discovered, camping on a second cell that satisfies the first condition and does not satisfy the second condition, among the plurality of neighboring cells in the RRC_Inactive state.

In accordance with an aspect of the disclosure, there is provided a terminal apparatus in a wireless communication system, and the terminal apparatus includes a transceiver and at least one processor, and the at least one processor is configured to determine to initiate a cell reselection in a radio resource control inactive state (RRC_Inactive state, search for a first cell that satisfies a first condition and a second condition among the plurality of neighboring cells, if the first cell is discovered, camp on the first cell, and if the first cell is not discovered, camp on a second cell that satisfies the first condition and does not satisfy the second condition among the plurality of neighboring cells in the RRC_Inactive state.

According to various embodiments of the disclosure, there is provided a method and apparatus for effectively performing a cell reselection in a wireless communication system.

Effects which can be acquired by the disclosure are not limited to the above-described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 19, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meanings as those commonly understood by a person skilled in the art to which the disclosure pertains. Such terms as those defined in a generally used dictionary may be interpreted to have meanings equal to the contextual meanings in the relevant field of art, and are not to be interpreted to have ideal or excessively formal meanings unless clearly defined in the disclosure. In some cases, even terms defined in the disclosure should not be interpreted to exclude embodiments of the disclosure.

The disclosure relates to a method and apparatus for performing camp-on with respect to a cell in a wireless communication system.

Hereinafter, terms indicating communication schemes, terms indicating signals, terms indicating information, terms indicating network entities, terms indicating elements of an apparatus, and the like used in the descriptions are for ease of description. Accordingly, the disclosure is not limited to the following terms, and other terms having the same technical meaning may be used.

Also, although the disclosure provides various embodiments using the terms used in some communication standards (e.g., $3^{rd}$-generation partnership project (3GPP)), the terms are merely used for the purpose of description. Various embodiments may be easily modified and applied to other communication systems.

Figure 1:
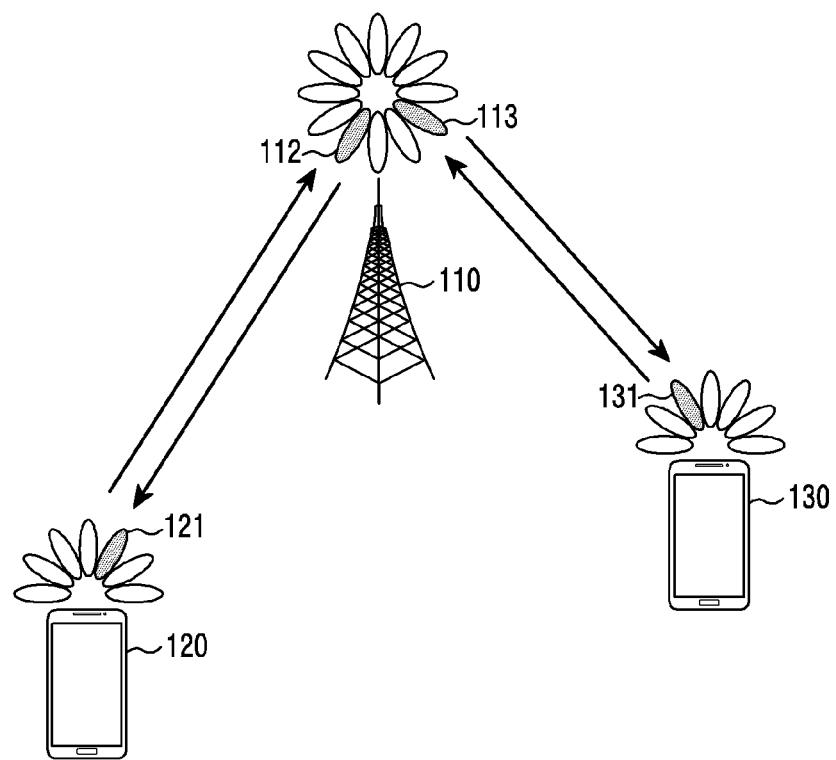
FIG. 1 is a diagram illustrating a wireless communication system according to various embodiments of the disclosure.

FIG. 1 is a diagram illustrating a wireless communication system according to various embodiments. FIG. 1 illustrates a base station 110, a terminal 120, and a terminal 130 as some of nodes that use a radio channel in a wireless communication system. Although a single base station is illustrated in FIG. 1, another base station that is the same as or similar to the base station 110 may be further included.

The base station 110 may be a network infrastructure that provides radio access to the terminals 120 and 130. The base station 110 may have coverage defined by a predetermined geographic area on the basis of the distance to which the base station 110 is capable of transmitting a signal. The base station 110 may be referred to as an "access point (AP)," "eNodeB (eNB)," "$5^{th}$-generation node (5G node)," "wireless point," "transmission/reception point (TRP)," or other terms having equivalent technical meanings, in addition to "base station."

Each of the terminal 120 and the terminal 130 is a device used by a user, and may perform communication with the base station 110 via a radio channel. Depending on the case, at least one of the terminals 120 and 130 may operate without being handled by a user. That is, at least one of the terminal 120 and the terminal 130 may be a device that performs machine-type communication (MTC), and may not be carried by a user. Each of the terminal 120 and the terminal 130 may be referred to as a "user equipment (UE)," "mobile station," "subscriber station," "remote terminal," "wireless terminal," "user device," or other terms having an equivalent technical meaning, in addition to "terminal."

The base station 110, the terminal 120, and the terminal 130 may transmit and receive a radio signal in a millimeter-wave (mmWave) band (e.g., 28 GHz, 30 GHz, 38 GHz, or 60 GHz). In this instance, to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search or beam management procedure. After the serving beams 112, 113, 121, and 131 are selected, communication may be performed via resources that are in a quasi-co-located (QCL) relationship with resources used for transmitting the serving beams 112, 113, 121, and 131.

If the large-scale characteristics of a channel that transmits a symbol on a first antenna port can be inferred from a channel that transmits a symbol on a second antenna port, it is regarded that the first antenna port and the second antenna port are in a QCL relationship. For example, the large-scale characteristics may include at least one of a delay spread, a Doppler spread, a Doppler shift, an average gain, an average delay, and a spatial receiver parameter.

Figure 2:
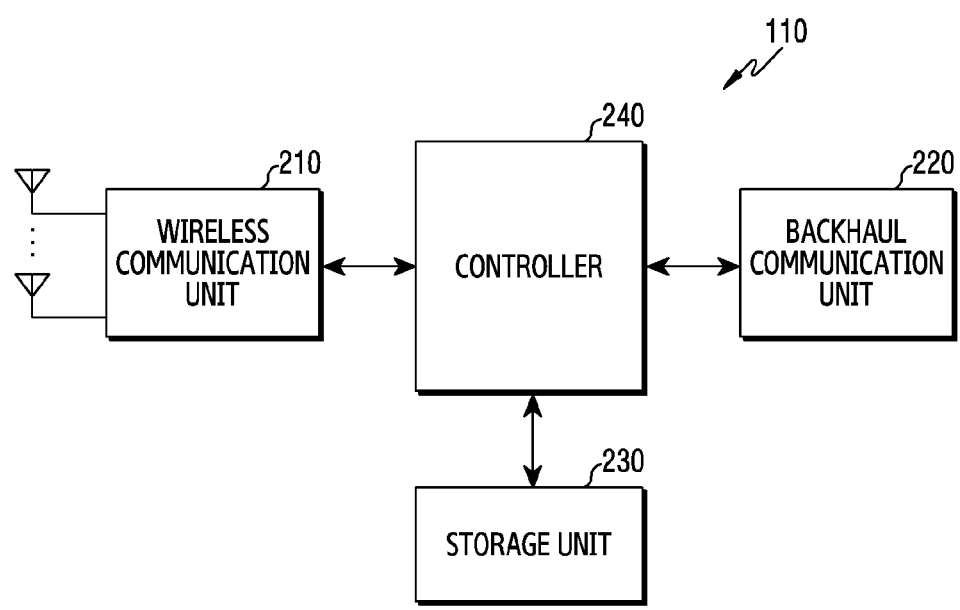
FIG. 2 is a diagram illustrating the exemplary configuration of a base station in a wireless communication system according to various embodiments of the disclosure.

FIG. 2 is a diagram illustrating the configuration of a base station in a wireless communication system according to various embodiments. The configuration of FIG. 2 may be understood as part of the configuration of the base station 110. The term " . . . unit" or suffix " . . . or," " . . . er," or the like may indicate a unit of processing at least one function or operation, and this may be implemented as hardware, software, or a combination of hardware and software.

Referring to FIG. 2, the base station may include a wireless communication unit 210, a backhaul communication unit 220, a storage unit 230, and a controller 240.

The wireless communication unit 210 may perform functions for transmitting and receiving signals via a radio channel. For example, the wireless communication unit 210 performs a function of conversion between a baseband signal and a bit stream according to the physical layer standard of the system. For example, when data is transmitted, the wireless communication unit 210 generates complex symbols by encoding and modulating a transmission bit stream. Also, when data is received, the wireless communication unit 210 restores a reception bit stream by demodulating and decoding a baseband signal.

Also, the wireless communication unit 210 upconverts a baseband signal into a radio-frequency (RF) band signal so as to transmit the same via an antenna, and downconverts an RF band signal received via an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission and reception paths. Furthermore, the wireless communication unit 210 may include at least one antenna array including a plurality of antenna elements.

From the perspective of hardware, the wireless communication unit 210 may include a digital unit and an analog unit, and the analog unit may include a plurality of subunits according to an operating power, an operating frequency, or the like. The digital unit may be implemented as at least one processor (e.g., a digital signal processor (DSP)).

The wireless communication unit 210 transmits and receives a signal as described above. Accordingly, the entirety or a part of the wireless communication unit 210 may function as a "transmitter," a "receiver," or a "transceiver." Also, the transmission and reception performed via a wireless channel, which is described in the following descriptions, may be understood to mean that the above-described processing is performed by the wireless communication unit 210.

The backhaul communication unit 220 provides an interface for performing communication with other nodes within the network. That is, the backhaul communication unit 220 converts a bit stream transmitted from the base station to another node, for example, another access node, another base station, an upper node, a core network, or the like, into a physical signal, and converts a physical signal received from another node into a bit stream.

The storage unit 230 may store data, such as a basic program for operating a base station, an application, configuration information, and the like. The storage unit 230 may be configured as volatile memory, nonvolatile memory, or a combination of volatile memory and nonvolatile memory. In addition, the storage unit 230 may provide data stored therein in response to a request from the controller 240.

The controller 240 controls the overall operation of the base station. For example, the controller 240 may transmit and receive a signal via the wireless communication unit 210 or the backhaul communication unit 220. Further, the controller 240 records data in the storage unit 230 and reads the recorded data. The controller 240 may perform the functions of a protocol stack required by a communication standard. According to another embodiment, the protocol stack may be included in the wireless communication unit 210. To this end, the controller 240 may include at least one processor.

Figure 3:
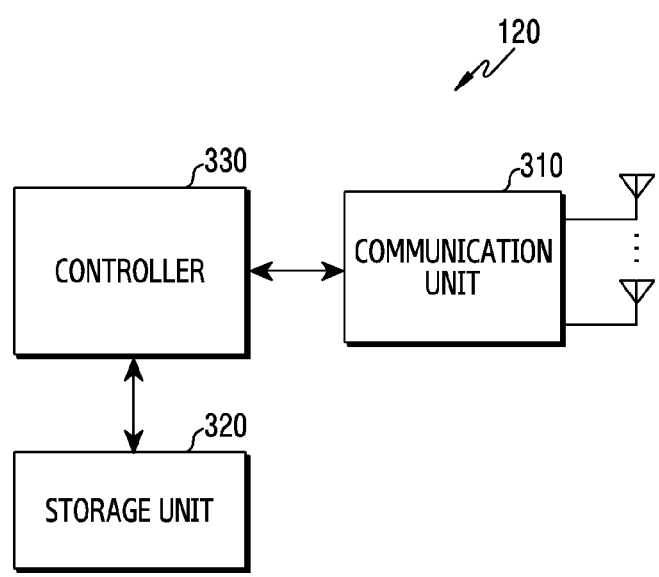
FIG. 3 is a diagram illustrating the exemplary configuration of a terminal in a wireless communication system according to various embodiments of the disclosure.

FIG. 3 is a diagram illustrating the configuration of a terminal in a wireless communication system according to various embodiments. The configuration of FIG. 3 may be understood as part of the configuration of the terminal 120. The term " . . . unit", suffix, such as " . . . or", " . . . er", or the like, may indicate a unit of processing at least one function or operation, and this may be implemented as hardware, software, or a combination of hardware and software.

Referring to FIG. 3, the terminal includes a communication unit 310, a storage unit 320, and a controller 330.

The communication unit 310 may perform functions for transmitting and receiving a signal via a radio channel. For example, the communication unit 310 performs a function of conversion between a baseband signal and a bit stream according to the physical layer standard of the system. For example, in the case of data transmission, the communication unit 310 generates complex symbols by encoding and modulating a transmission bit stream. Also, in the case of data reception, the communication unit 310 restores a reception bit stream by demodulating and decoding a baseband signal. Also, the communication unit 310 upconverts a baseband signal into an RF band signal so as to transmit the same via an antenna, and downconverts an RF band signal received via an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission and reception paths. In addition, the communication unit 310 may include at least one antenna array including a plurality of antenna elements. The communication unit 310 may include a digital circuit and an analog circuit (e.g., a radio-frequency integrated circuit (RFIC)) from the perspective of hardware. Here, the digital circuit and the analog circuit may be implemented as a single package. Also, the communication unit 310 may include a plurality of RF chains. In addition, the communication unit 310 may perform beamforming.

The communication unit 310 transmits and receives a signal as described above. Accordingly, the entirety or a part of the communication unit 310 may be referred to as a "transmitting unit," a "receiving unit," or a "transceiving unit." Also, the transmission and reception performed via a radio channel, which is to be described in the following description, may be understood to mean that the above-described processing is performed by the communication unit 310.

The storage unit 320 may store data, such as a basic program for operating a terminal, an application, configuration information, and the like. The storage unit 320 may be configured as volatile memory, nonvolatile memory, or a combination of volatile memory and nonvolatile memory. In addition, the storage unit 320 may provide data stored therein in response to a request from the controller 330.

The controller 330 may control the overall operation of a terminal. For example, the controller 330 may transmit and receive a signal via the communication unit 310. Further, the controller 330 records data in the storage unit 320 and reads the recorded data. The controller 330 may perform the functions of a protocol stack required by a communication standard. To this end, the controller 330 may include at least one processor or microprocessor, or may be a part of the processor. Also, a part of the communication unit 310 and the controller 330 may be referred to as a communication processor (CP).

Figure 4:
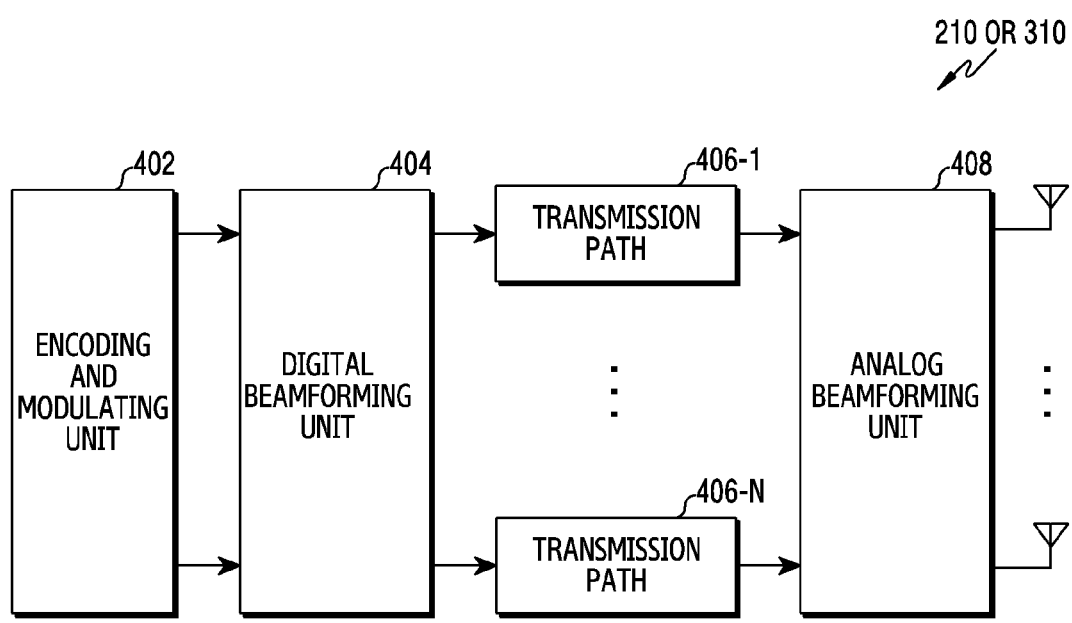
FIG. 4 is a diagram illustrating the exemplary configuration of a communication unit in a wireless communication system according to various embodiments of the disclosure.

FIG. 4 is a diagram illustrating the configuration of a communication unit in a wireless communication system according to various embodiments. FIG. 4 illustrates an example of the detailed configuration of the wireless communication unit 210 of FIG. 2 or the communication unit 310 of FIG. 3. In particular, FIG. 4 illustrates elements for performing beamforming, which are part of the wireless communication unit 210 of FIG. 2 or the communication unit 310 of FIG. 3.

Referring to FIG. 4, the wireless communication unit 210 or the communication unit 310 may include an encoding and modulating unit 402, a digital beamforming unit 404, a plurality of transmission paths 406-1 to 406-N, and an analog beamforming unit 408.

The encoding and modulating unit 402 may perform channel encoding. To perform channel encoding, at least one of low-density parity-check (LDPC) coding, convolution coding, and polar coding may be used. The encoding and modulating unit 402 may generate modulated symbols by performing constellation mapping.

The digital beamforming unit 404 may perform beamforming with respect to a digital signal (e.g., modulated symbols). To this end, the digital beamforming unit 404 may multiply the modulated symbols by beamforming weights. Here, the beamforming weights may be used to change the magnitude and the phase of a signal, and may be referred to as a "precoding matrix," a "precoder," or the like. The digital beamforming unit 404 may output digital beamformed modulated symbols to the plurality of transmission paths 406-1 to 406-N. In this instance, according to a multiple-input multiple-output (MIMO) transmission scheme, the modulated symbols may be multiplexed, or the same modulated symbols may be provided to the plurality of transmission paths 406-1 to 406-N.

The plurality of transmission paths 406-1 to 406-N may convert the digital-beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme, and the case in which another physical layer scheme (e.g., filter bank multi-carrier (FBMC)) is applied may be excluded. That is, the plurality of transmission paths 406-1 to 406-N may provide an independent signal-processing process for a plurality of streams generated via digital beamforming. Depending on the implementation scheme, some of the elements of the plurality of transmission paths 406-1 to 406-N may be used in common.

The analog beamforming unit 408 may perform beamforming with respect to an analog signal. To this end, the digital beamforming unit 404 may multiply analog signals by beamforming weights. Here, the beamforming weights may be used for changing the magnitude and the phase of a signal. Particularly, the analog beamforming unit 408 may be configured as shown in FIG. 4B or 4C according to the connection structure between the plurality of transmission paths 406-1 to 406-N and antennas.

Figure 5:
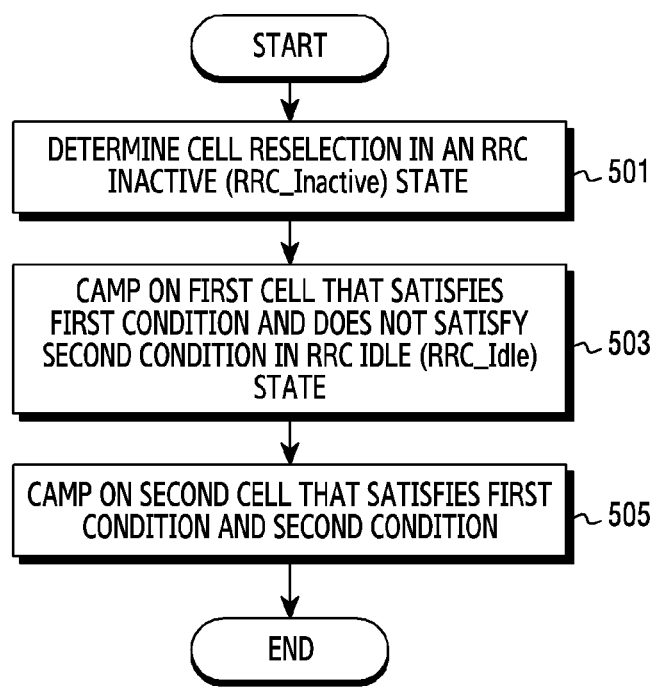
FIG. 5 is a flowchart illustrating the exemplary operations of a terminal in a wireless communication system according to various embodiments of the disclosure.

As illustrated in FIG. 5, various embodiments of the disclosure provide an operation procedure of a terminal in a power-saving mode/state, RRC inactive mode/state, or an RRC lightly connected mode for a system including one or more base stations and one or more terminals. Also, the embodiments provide a method in which a terminal, which operates in the power-saving mode, selects one of a suitable cell and an acceptable cell which are discovered around the terminal and performs transmission and reception of information with the corresponding cell. The embodiments provide a method, procedure, and system for performing state transition of a terminal.

A description of technology that is well-known in the art and is not directly related to the technical subject matter of the disclosure will be omitted. The omission of unnecessary descriptions is intended to prevent obscuring of the main idea of the disclosure and to more clearly transfer the main idea.

For the same reason, in the accompanying drawings, some elements may be exaggerated, omitted, or schematically illustrated. Further, the size of each element does not accurately reflect the actual size. In the drawings, like or corresponding elements are indicated by like reference numerals.

The advantages and features of the disclosure and ways to achieve them will be made apparent by making reference to the embodiments described below in detail in conjunction with the accompanying drawings. However, the disclosure may be implemented in many different forms and should not be construed as being limited to the embodiments set forth herein; rather, these embodiments are provided so that this disclosure will be through and complete, and will fully convey the concept of the disclosure to those skilled in the art. The disclosure is defined by the scope of claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special-purpose computer, or other programmable data-processing apparatus, such that the instructions, which are executed by the processor of the computer or other programmable data-processing apparatus, may produce a means for implementing the functions specified in the flowchart block or blocks. These computer program instructions may also be stored in a computer-usable or computer-readable memory that can direct a computer or other programmable data-processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process such that the instructions executed on the computer or other programmable data-processing apparatus provide steps for implementing the functions specified in the flowchart block or blocks.

Moreover, each block of the flowchart illustrations may represent a module, segment, or portion of code, which includes one or more executable instructions for implementing the specified logical function(s). It should also be noted that in some alternative implementations, the functions of the blocks may be performed in a different order. For example, two blocks shown in succession may in fact be executed substantially concurrently, or the blocks may sometimes be executed in the reverse order, depending upon the functionality involved.

As used herein, the term, " . . . unit" refers to a software element or a hardware element, such as a field-programmable gate array (FPGA) or an application-specific integrated circuit (ASIC), which performs a predetermined function. However, " . . . unit" does not always have a meaning limited to software or hardware, " . . . unit" may be configured to be stored in an addressable storage medium or to execute one or more processors. Therefore, " . . . unit" includes elements, for example, software elements, object-oriented software elements, class elements or task elements, processes, functions, properties, procedures, subroutines, segments of program code, drivers, firmware, micro-code, circuits, data, databases, data structures, tables, arrays, and parameters. The elements and functions provided by " . . . units" may be combined into a smaller number of elements and " . . . units", or may be divided into a larger number of elements and " . . . units". Moreover, the elements and " . . . units" may be implemented to reproduce one or more CPUs within a device or a secure multimedia card. Also, according to an embodiment, " . . . unit" may include one or more processors.

As a smart phone or the like has been introduced, the use of wireless communication networks and portable electronic devices by users has been dramatically increased. As the users desire to use portable electronic devices without interruption, the demand for extended battery life is increasing. Therefore, effective power-saving technology is needed. To this end, a terminal needs to perform a power-saving-mode operation. In order to effectively reduce the amount of power consumed by a terminal, various technologies that allow a terminal to more frequently operate in the power-saving mode and to more quickly reconfigure a connection with a network have been proposed and standardized.

Various embodiments of a terminal's power-saving mode are as follows:
1. Operation of a power-saving state terminal which operates in a sub-state of an RRC connected state;
2. Operation of a power saving state terminal which operates in a sub-state of an RRC idle state;
3. Operation of a power saving state terminal that operates in a new RRC state;
4. Operation in an LTE lightly connected state;
5. Operation in a 5G NR RRC_inactive state (RRC_INACTIVE state); and
6. Operation in a WLAN (IEEE 802.11) power save mode.

In the disclosure, while a terminal is operating in the power-saving mode, when the terminal discovers a network existing around the terminal and fails to discover a cell which is suitable for the terminal to attempt connection in order to maintain and configure connection, to receive a paging message, or to transmit/receive other emergency messages, the terminal may consider an operation for improving the performance of the terminal. When the terminal fails to discover a suitable cell, the terminal may select an acceptable cell that is incapable of accessing a network but is capable of transmitting/receiving an emergency message. In this instance, a condition for state transition of the terminal and a state transition method and procedure will be described.

Also, the disclosure proposes a detailed state transition condition for a terminal and a detailed state transition method and procedure in order to improve the performance of the terminal when the terminal discovers a suitable cell while the terminal camps on an acceptable cell in the power-saving mode or idle mode.

The definitions of the suitable cell and the acceptable cell are as follows:
1. The suitable cell is a cell that a terminal is capable of camping on. That is, the terminal may maintain the possibility of connection with the cell, for example, the terminal is synchronized with the cell in order to receive a normal wireless communication service. In the case of the suitable cell, a representative cell measurement value needs to be suitable for a cell selection criterion. A service provider (public land mobile network (PLMN)) of the suitable cell is a selected PLMN, and the PLMN is a PLMN with which the terminal is registered or a PLMN equivalent thereto. Also, it is required that the suitable cell is not barred or reserved, and is not part of a tracking area listed in a list of tracking areas that are not allowed for roaming.
2. The acceptable cell is a cell that a terminal is capable of camping on. That is, the terminal maintains the possibility of connection with the cell, for example, the terminal is synchronized with the cell in order to receive a limited wireless communication service, such as emergency call transmission and reception initiated by the terminal and earthquake and disaster alerts (earthquake and tsunami warning system (ETWS) and commercial mobile alert system (CMAS)). In the case of the acceptable cell, it is required that measured cell attributes are suitable for the terminal's cell selection criteria, and the cell is not barred.

FIG. 5 is a flowchart illustrating the operation of a terminal in a wireless communication system according to various embodiments. FIG. 5 illustrates the operation method of the terminal 120.

Referring to FIG. 5, in operation 501, the terminal may determine a cell reselection in a power-saving mode (inactive mode). Cell reselection may be determined when the quality value of a serving cell of the terminal is less than or equal to a predetermined threshold value, when the quality value of one of a plurality of neighboring cells is greater than or equal to a predetermined threshold value, or when the difference between the quality value of the serving cell of the terminal and the quality value of one of the plurality of neighboring cells is greater than or equal to a predetermined threshold value.

Particularly, a cell reselection may begin when at least one of the following conditions is satisfied. The conditions include: a cell reselection is always performed; a cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell−the channel quality value of a serving cell>predetermined threshold value); a hypothetical PDCCH failure increases by at least a predetermined threshold value (above a threshold); a successful transmission rate decreases (failure rate increases); or the like.

In operation 503, the terminal may camp on a first cell that satisfies a first condition but does not satisfy a second condition, among a plurality of neighboring cells. According to an embodiment, the first condition is that the quality value of a cell be greater than or equal to a predetermined value, and the second condition is that the service provider of a cell be the same as the service provider with which the terminal is registered. According to another embodiment, the first cell may be an acceptable cell, measured cell attributes need to be suitable for the terminal's cell selection criterion, and the cell should not be barred.

In operation 505, the terminal may search for a second cell that satisfies the first condition and the second condition from among the plurality of neighboring cells. The terminal starts a timer, and if the second cell is not discovered until the timer expires, the terminal may change the state to an idle mode. Also, if the second cell is discovered before the timer expires, the terminal may camp on the second cell, and may stop the timer. According to an embodiment, the second cell may be a suitable cell. The service provider (public land mobile network (PLMN)) of the suitable cell is a selected PLMN, and may be a PLMN with which the terminal is registered or a PLMN equivalent thereto. Also, the suitable cell should not be barred or reserved, and should not be part of a tracking area listed in a list of tracking areas that are not allowed for roaming.

Figure 6:
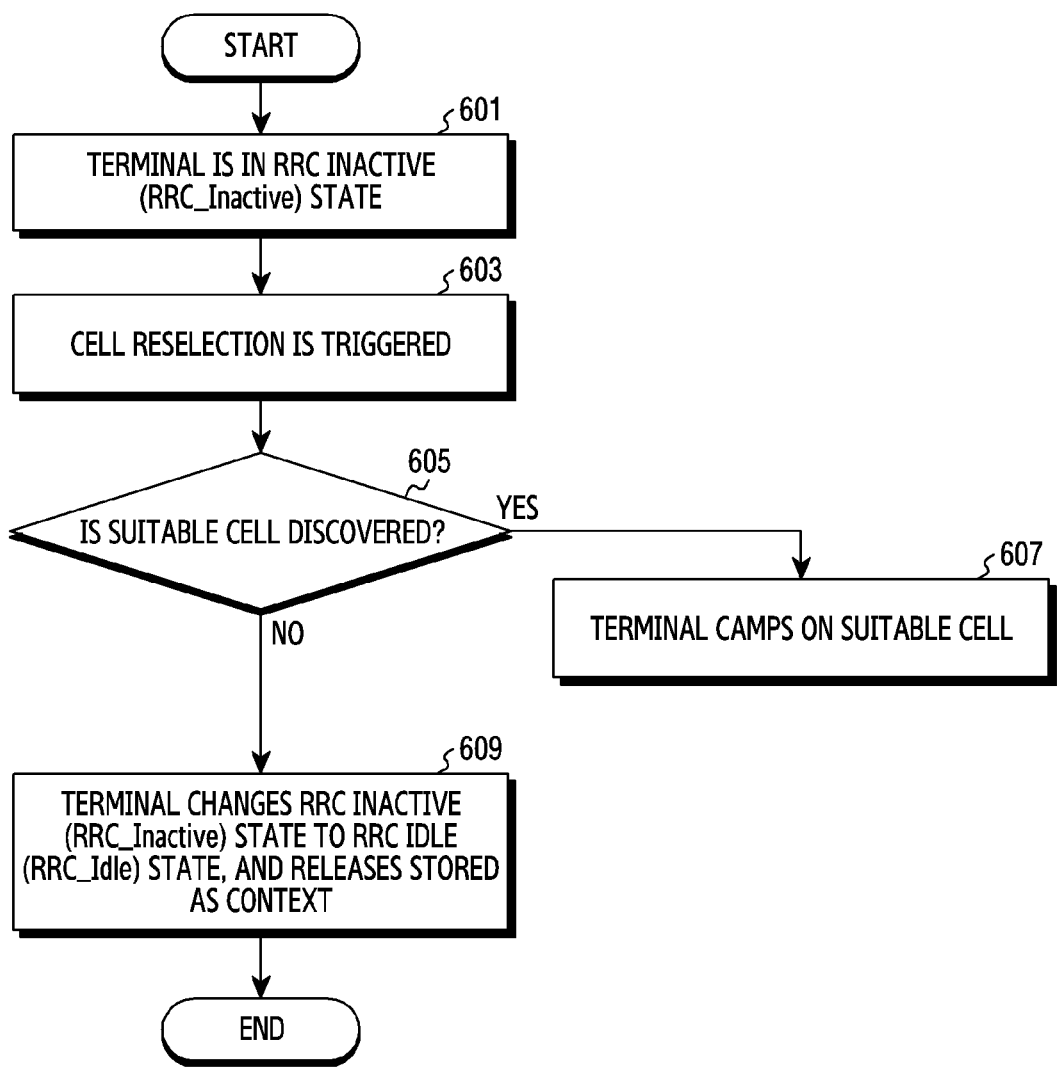
FIG. 6 is a flowchart illustrating an exemplary cell reselection process according to various embodiments of the disclosure.

FIG. 6 is a flowchart illustrating an exemplary cell reselection process according to various embodiments of the disclosure.

In operation 601, the terminal may receive and transmit both a necessary emergency call and an ETWS/CMAS alarm in an acceptable cell while operating in a power-saving mode (RRC_inactive or power-saving mode) until one of predetermined conditions is satisfied, and may maintain connection information associated with connection with a previous network as long as it is needed, such that the terminal is capable of quickly connecting to the network if connection is needed. More particularly, the terminal may camp on the acceptable cell and may maintain access stratum (AS) context until the one of predetermined conditions is satisfied, and if a suitable cell is discovered, the terminal may quickly connect to the network using the corresponding context (e.g., RRC suspend/resume).

Also, according to various embodiments, if the terminal satisfies a predetermined condition in the state in which the terminal camps on the acceptable cell, the terminal changes from the power-saving mode to the idle mode. Then, if the terminal discovers a suitable cell, the terminal may attempt to connect to the network so as to eliminate discordance between the terminal and the network according to a predetermined condition.

According to an embodiment, the terminal operates in the power-saving mode in operation 601, is triggered (starts) to perform a downlink cell reselection in operation 603, and searches for a suitable cell among neighboring cells in operation 605. If no suitable cell is discovered among neighboring cells, such as the nearest neighboring cell or the like in operation 605, the terminal may change the state to the idle mode in operation 609. Also, the terminal may release a stored AS context. If a suitable cell is discovered among the neighboring cells in operation 605, the terminal may camp on the suitable cell in operation 607.

In operation 603, a cell reselection may begin when at least one of the following conditions is satisfied. The conditions include: cell reselection is always performed; cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell−the channel quality value of a serving cell>predetermined threshold value); a hypothetical PDCCH failure increases by at least a predetermined threshold value (above a threshold); a successful transmission rate decreases (failure rate increases), or the like.

Figure 7:
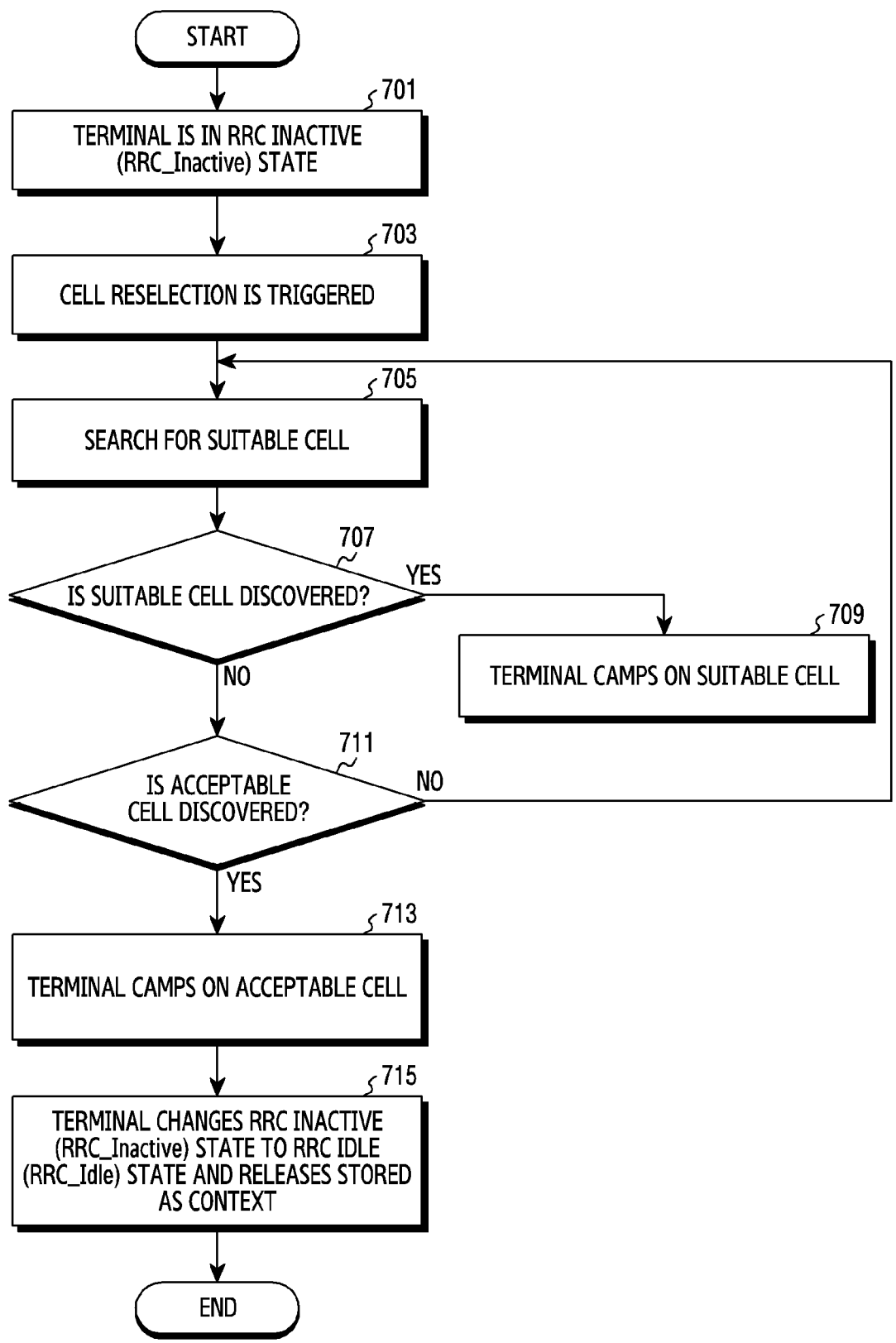
FIG. 7 is a flowchart illustrating another exemplary cell reselection process according to various embodiments of the disclosure.

FIG. 7 is a flowchart illustrating a process in which a terminal performs cell reselection according to various embodiments.

The terminal operates in a power-saving mode in operation 701, is triggered (starts) to perform downlink cell reselection in operation 703, and searches for a suitable cell among neighboring cells in operation 705. If no suitable cell is discovered among neighboring cells in operation 707 and an acceptable cell is discovered in operation 711, the terminal may change the state to an idle mode at the time at which, after or immediately before the terminal camps on the acceptable cell in operations 713 and 715. If a suitable cell is discovered among the neighboring cells in operation 707, the terminal may camp on the suitable cell in operation 709.

In operation 703, a cell reselection may begin when at least one the following conditions is satisfied. The conditions include: a cell reselection is always performed; a cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

While the terminal camps on the acceptable cell, the terminal continuously searches for a suitable cell. If a suitable cell is discovered, the terminal may camp on the suitable cell.

Figure 8:
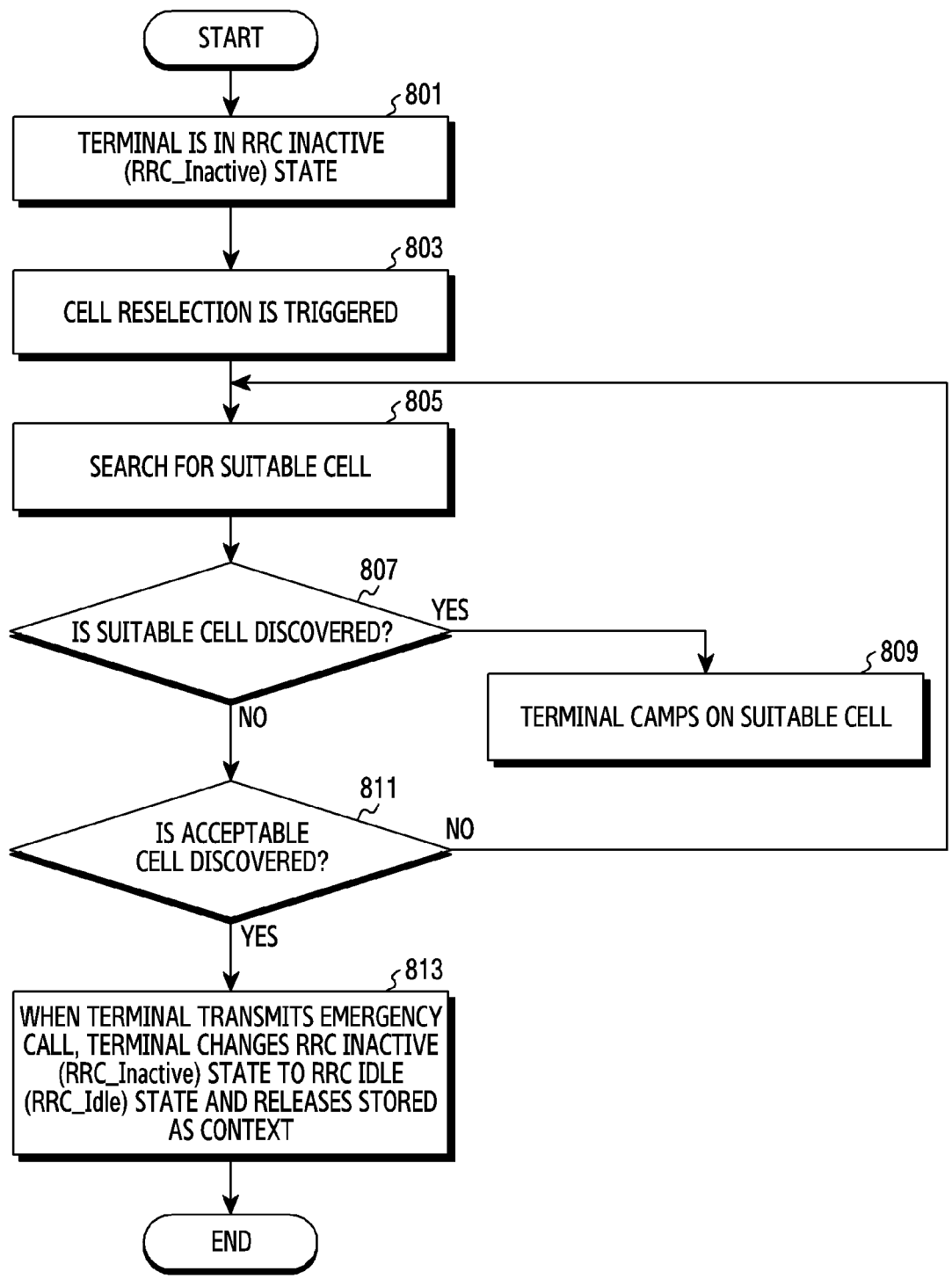
FIG. 8 is a flowchart illustrating a process in which a terminal performs cell reselection according to various embodiments of the disclosure.

FIG. 8 is a flowchart illustrating a process in which a terminal performs a cell reselection according to various embodiments.

The terminal operates in a power-saving mode in operation 801, is triggered (starts) to perform a downlink cell reselection in operation 803, and searches for a suitable cell among neighboring cells in operation 805. If no suitable cell is discovered among neighboring cells in operation 807 and an acceptable cell is discovered in operation 811, the terminal may camp on the acceptable cell in the state of maintaining the power-saving mode. If a suitable cell is discovered among the neighboring cells in operation 807, the terminal may camp on the suitable cell in operation 809.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, an attach request, or the like).

In operation 803, a cell reselection may begin when at least one of the following conditions is satisfied. The conditions include: a cell reselection is always performed; a cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. If the terminal maintains the power-saving mode, the terminal is incapable of transmitting an emergency call. Therefore, according to an embodiment, if the terminal needs to transmit an emergency call, the terminal changes the state to an idle mode, and may transmit an emergency call using the acceptable cell in operation 813. Also, the terminal may release the stored AS context.

While the terminal camps on the acceptable cell, the terminal continuously searches for a suitable cell. If a suitable cell is discovered, the terminal may camp on the suitable cell.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception);
   (2) begin to change and update a power-saving-mode tracking area that the terminal triggers periodically or if one of the predetermined conditions is satisfied (begin to update a RAN notification area and RAN tracking area);
   (3) begin to receive idle-mode paging (begin CN paging monitoring & CN paging reception);
   (4) begin to change and update a CN tracking area that the terminal triggers periodically or if one of the predetermined conditions is satisfied (begin to update a tracking area (TA)); and
   (5) begin an attempt to establish a connection that the terminal triggers periodically or if one of the predetermined conditions is satisfied (begin sending a service request, attach request, or the like);
2. If the acceptable cell that the terminal camps on is not a cell that belongs to the same area as a power-saving-mode tracking area (RAN paging area and RAN notification area) to which the terminal previously belonged:
   (1) immediately begin to change and update a power-saving-mode tracking area that the terminal triggers (begin to update a RAN notification area and RAN tracking area):
   (1-1) if successfully performed, begin an attempt to receive power-saving-mode paging (begin RAN paging monitoring & RAN paging reception); and (1-2) if not successfully performed, the terminal changes to an idle mode, and attempts to establish an RRC connection such as updating a tracking area, sending a service request, sending an attach request, or the like, so as to connect to a network (change to a connected mode);
(2) begin to receive idle-mode paging (begin CN paging monitoring & CN paging reception);
(3) begin to change and update a CN tracking area that the terminal triggers periodically or if one of the predetermined conditions is satisfied (begin updating a tracking area (TA)); and
(4) begin an attempt to establish a connection that the terminal triggers periodically or if one of the predetermined condition is satisfied (begin sending a service request, an attach request, or the like).

Figure 9:
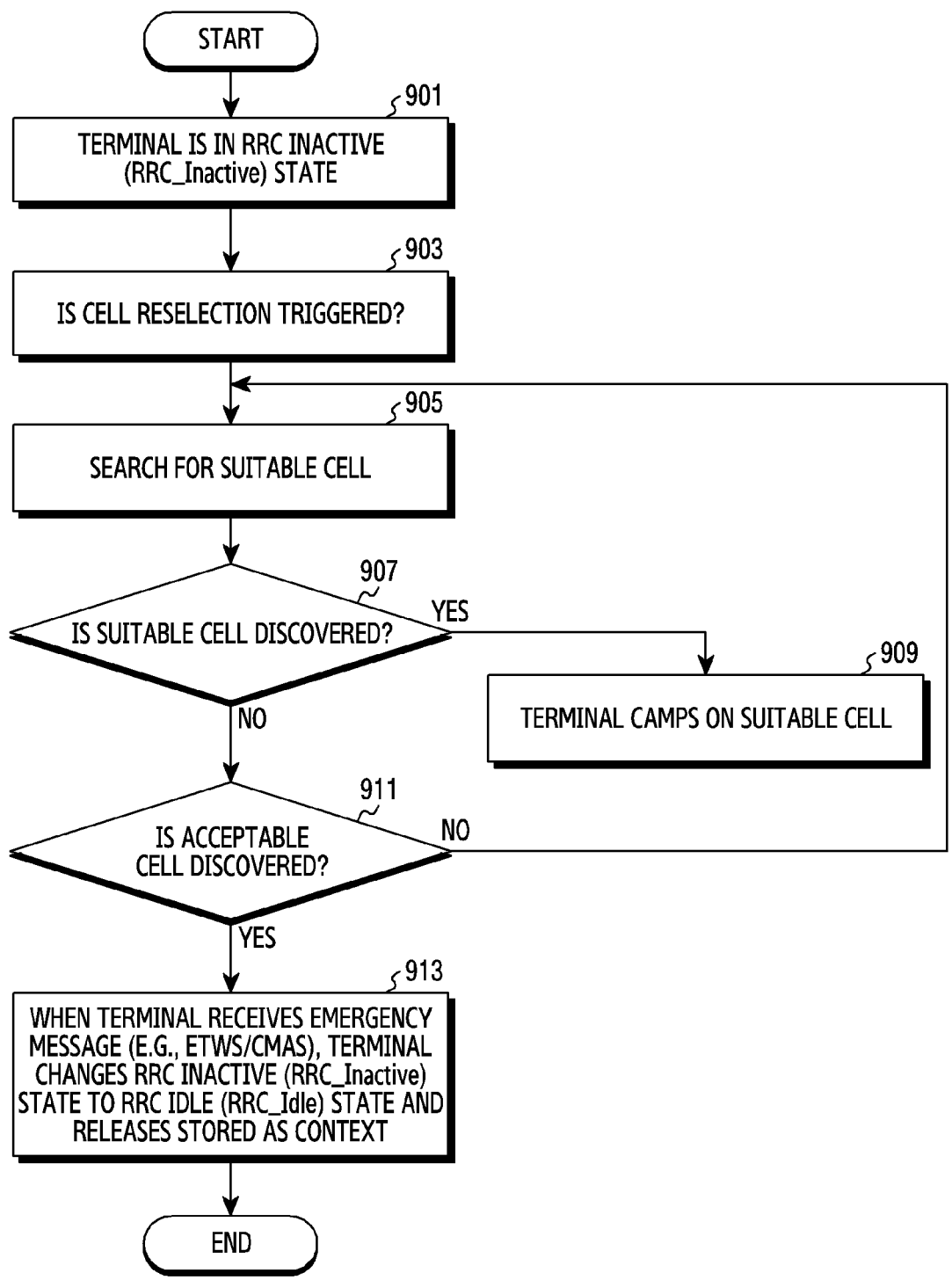
FIG. 9 is a flowchart illustrating another exemplary cell reselection process according to various embodiments of the disclosure.

FIG. 9 is a flowchart illustrating a process in which a terminal performs a cell reselection according to various embodiments.

The terminal operates in a power-saving mode in operation 901, is triggered (starts) to perform a downlink cell reselection in operation 903, and searches for a suitable cell among neighboring cells in operation 905. If no suitable cell is discovered among the neighboring cells in operation 907 and an acceptable cell is discovered in operation 911, the terminal may camp on the acceptable cell in the state of maintaining the power-saving mode. If a suitable cell is discovered among the neighboring cells in operation 907, the terminal may camp on the suitable cell in operation 909.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal can suspend are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend changing and updating of a RAN notification area and RAN tracking area);
3. suspend an attempt to receive idle-mode paging (suspend CN paging monitoring & CN paging reception);
4. suspend changing and updating of a CN tracking area that the terminal triggers periodically of if one of the predetermined conditions is satisfied; and
5. suspend an attempt to establish a connection that the terminal triggers periodically or if one of the predetermined condition is satisfied (suspend sending a service request, attach request, or the like).

In operation 903, the cell reselection may begin when at least one of the following conditions is satisfied. The conditions include: the cell reselection is always performed; the cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. If the terminal receives an emergency/disaster message (e.g., ETWS/CMAS) from the acceptable cell that the terminal camps on, the terminal may change the state to an idle mode in operation 913. In the case in which an emergency/disaster message is received, making an emergency call is expected after a user checks the message. Accordingly, the terminal performs state transition by expecting that an emergency call is to be made in the future. Also, the terminal may release the stored AS context.

While the terminal camps on the acceptable cell, the terminal continuously searches for a suitable cell. If a suitable cell is discovered, the terminal may camp on the suitable cell.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area and RAN notification area) to which the terminal previously belonged:
   (1) begin an attempt to receive power-saving-mode paging (begin RAN paging monitoring & RAN paging reception);
   (2) begin to change and update a power-saving-mode tracking area that the terminal triggers periodically or if one of the predetermined conditions is satisfied (begin to update a RAN notification area and RAN tracking area);
   (3) begin to receive idle-mode paging (begin CN paging monitoring & CN paging reception);
   (4) begin to change and update a CN tracking area that the terminal triggers periodically or if one of the predetermined conditions is satisfied (begin updating a tracking area (TA)); and
   (5) begin an attempt to establish a connection that the terminal triggers periodically or if one of the predetermined conditions is satisfied (begin sending a service request, attach request, or the like);
2. If the acceptable cell that the terminal camps on is not a cell that belongs to the same area as a power-saving-mode tracking area (RAN paging area and RAN notification area) to which the terminal previously belonged:
   (1) immediately begin to change and update a power-saving-mode tracking area that the terminal triggers (begin updating a RAN notification area and RAN tracking area):
   (1-1) if successfully performed, begin an attempt to receive power-saving-mode paging (begin RAN paging monitoring & RAN paging reception); and (1-2) if not successfully performed, the terminal changes to an idle mode, and attempts to establish an RRC connection such as updating a tracking area, sending a service request, sending an attach request, or the like, so as to connect to a network (change to a connected mode);

(2) begin to receive idle-mode paging (begin CN paging monitoring & CN paging reception);

(3) begin to change and update a CN tracking area that the terminal triggers periodically or if one of the predetermined conditions is satisfied (begin updating a tracking area (TA));

(4) begin an attempt to establish a connection that the terminal triggers periodically or if one of the predetermined conditions is satisfied (begin sending a service request, attach request, or the like).

Figure 10:
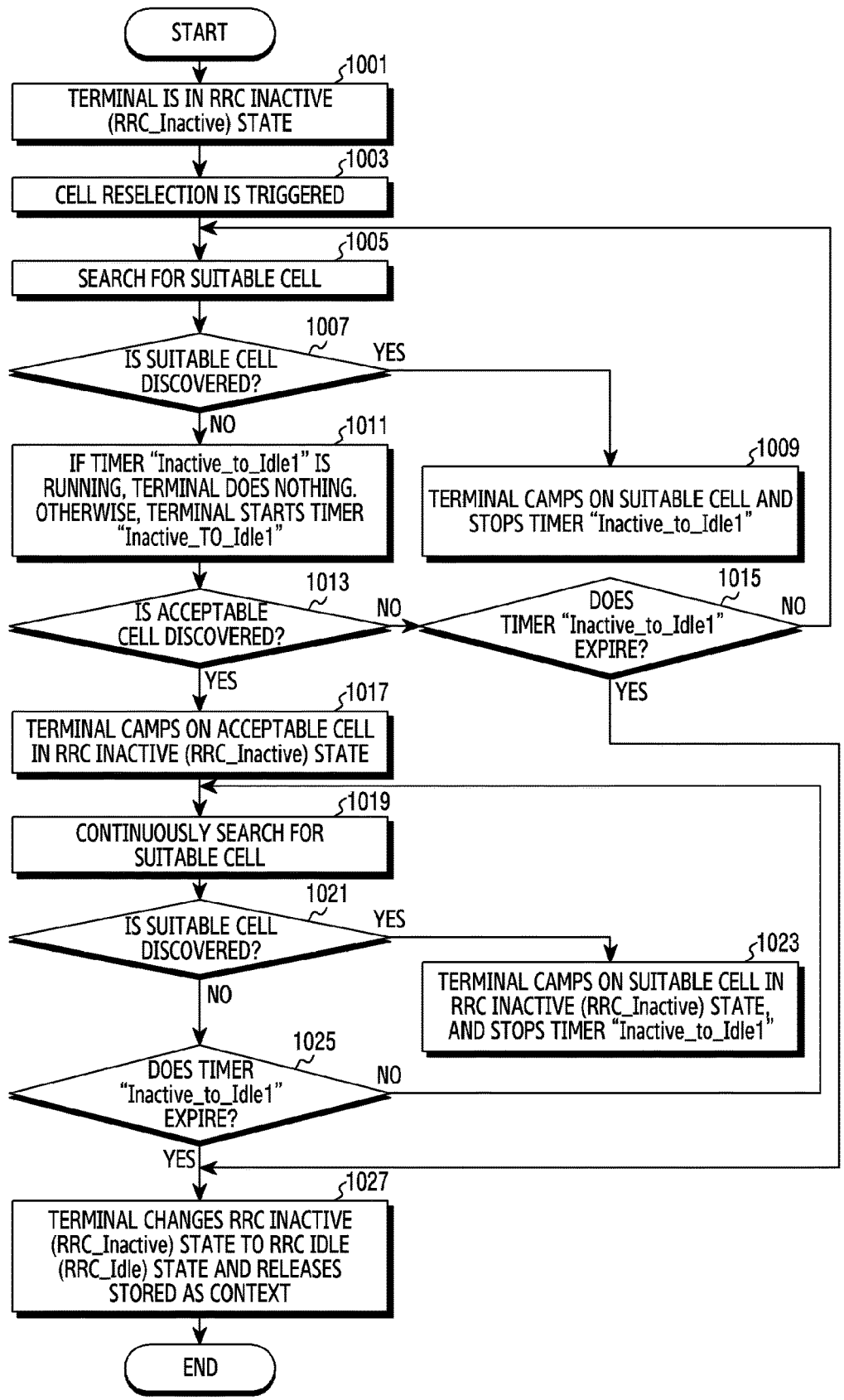
FIG. 10 is a flowchart illustrating another exemplary cell reselection process according to various embodiments of the disclosure.

FIG. 10 is a flowchart illustrating a process in which a terminal performs a cell reselection according to various embodiments.

The terminal operates in a power-saving mode in operation 1001, is triggered (starts) to perform a downlink cell reselection in operation 1003, and searches for a suitable cell among neighboring cells in operation 1005. When no suitable cell is discovered among the neighboring cells in operation 1007, if a predetermined timer ("inactive_to_idle1") is not running, the terminal starts the timer ("inactive_to_idle1") in operation 1011. The timer ("inactive_to_idle1") is used to change the state of the terminal to an idle mode (IDLE) when the terminal searches for a suitable cell in the power-saving mode (RRC_Inactive) during a corresponding period of time and a suitable cell is not discovered. Also, if the corresponding timer ("Inactive_to_Idle1") is already running, the terminal may not do anything in operation 1011.

In operation 1003, a cell reselection may begin when at least one of the following conditions is satisfied: The conditions include: a cell reselection is always performed; a cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

If a suitable cell is discovered among the neighboring cells in operation 1007, the terminal may camp on the suitable cell in operation 1009. In this instance, the terminal may stop the timer ("Inactive_to_Idle1") and initialize the same.

If the timer ("Inactive_to_Idle1") expires in operation 1015 when the terminal does not discover an acceptable cell even though the terminal continuously searches for a suitable cell and an acceptable cell in operation 1013, the terminal may change the state to the idle mode in operation 1027. Also, the terminal may release a stored AS context. When an acceptable cell is discovered in operation 1013, the terminal may camp on the corresponding acceptable cell in the state of maintaining the power-saving mode in operation 1017. In this instance, the terminal continuously searches for a suitable cell in operation 1019, and if a suitable cell is discovered in operation 1021, the terminal is capable of quickly performing reconnection using the AS context that the terminal maintains in operation 1023, which is advantageous.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:

1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied;
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, attach request, or the like).

While the terminal camps on the acceptable cell in the state of maintaining the power-saving mode in operation 1017, the terminal continuously searches for a suitable cell in operation 1019. If a suitable cell is discovered in operation 1021, the terminal may camp on the suitable cell in operation 1023. In this instance, the terminal may initialize the timer ("Inactive_to_Idle1"). If the timer ("Inactive_to_Idle1") expires in operation 1025 when the terminal does not discover a suitable cell in operation 1021 and camps on the acceptable cell, the terminal may change the state to the idle mode in operation 1027. Also, the terminal may release a stored AS context.

While the terminal camps on the acceptable cell in the state of maintaining the power-saving mode (inactive) in operation 1017, the terminal continuously searches for a suitable cell in operation 1019. If the terminal discovers a suitable cell in operation 1021 and the terminal camps on the suitable cell in operation 1023, the terminal may need to begin, again, some or all of the operations that the terminal has suspended since the terminal camped on the acceptable cell in the state of maintaining the power-saving mode. Some or all of the operations that the terminal suspends are as follows:

1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception);
   (2) begin to change and update a power-saving-mode tracking area that the terminal triggers periodically or if one of the predetermined conditions is satisfied (begin to update a RAN notification area and RAN tracking area);

(3) begin to receive idle-mode paging (begin CN paging monitoring & CN paging reception);
(4) begin to change and update a CN tracking area that the terminal triggers periodically or if one of the predetermined conditions is satisfied (begin updating a tracking area (TA)); and
(5) begin an attempt to establish a connection that the terminal triggers periodically or if one of the predetermined conditions is satisfied (begin sending a service request, attach request, or the like);

2. If the acceptable cell that the terminal camps on is not a cell that belongs to the same area as a power-saving-mode tracking area (RAN paging area, RAN notification area) to which the terminal previously belonged:
   (1) immediately begin to change and update a power-saving-mode tracking area that the terminal triggers (begin updating a RAN notification area and RAN tracking area):
   (1-1) if successfully performed, begin an attempt to receive power-saving-mode paging (begin RAN paging monitoring & RAN paging reception); and
   (1-2) if not successfully performed, change to an idle mode and attempt to establish an RRC connection such as updating a tracking area, sending a service request, sending an attach request, or the like, so as to connect to a network (change to a connected mode);
   (2) begin to receive idle-mode paging (begin CN paging monitoring & CN paging reception);
   (3) begin to change and update a CN tracking area that the terminal triggers periodically or if one of the predetermined conditions is satisfied (begin updating a tracking area (TA)); and
   (4) begin an attempt to establish a connection that the terminal triggers periodically or if one of the predetermined conditions is satisfied (begin sending a service request, attach request, or the like).

Figure 11:
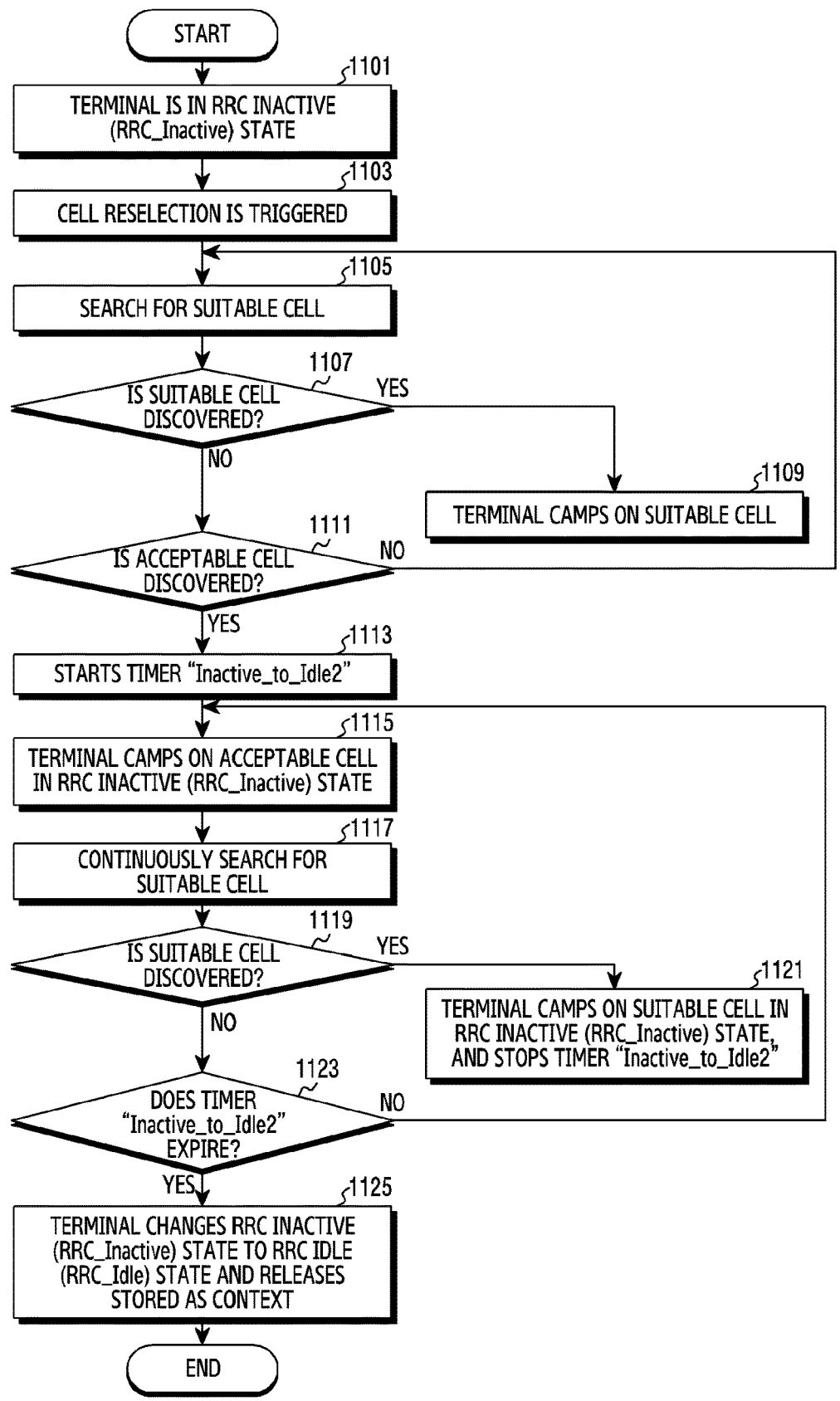
FIG. 11 is a flowchart illustrating another exemplary cell reselection process according to various embodiments of the disclosure.

FIG. 11 is a flowchart illustrating a process in which a terminal performs a cell reselection according to various embodiments.

The terminal operates in the power-saving mode in operation 1101, is triggered (starts) to perform a downlink cell reselection in operation 1103, and searches for a suitable cell among neighboring cells in operation 1105. If no suitable cell is discovered among the neighboring cells in operation 1107 and an acceptable cell is discovered in operation 1111, the terminal may camp on the acceptable cell in the state of maintaining the power-saving mode in operation 1115. If a suitable cell is discovered among the neighboring cells in operation 1107, the terminal may camp on the suitable cell in operation 1109.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, attach request, or the like).

In operation 1103, a cell reselection may begin when at least one of the following conditions is satisfied. The conditions include: a cell reselection is always performed; cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. The terminal may start a predetermined time ("inactive_to_Idle2") in operation 1113 immediately before, at the same time as, or immediately after the terminal camps on the acceptable cell in operation 1115. The timer ("inactive_to_idle1") is used to change the state of the terminal to an idle mode (IDLE) when the terminal searches for a suitable cell during a corresponding period of time and a suitable cell is not discovered, in the case in which the terminal camps on the acceptable cell in the power-saving mode (RRC_Inactive) state. While the terminal camps on the acceptable cell in the state of maintaining the power-saving mode, the terminal continuously searches for a suitable cell in operation 1117. If a suitable cell is discovered in operation 1119, the terminal may camp on the suitable cell in operation 1121. In this instance, the terminal may stop the timer ("Inactive_to_Idle2") and initialize the same.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception); and (2) begin to change and update a power-saving-mode tracking area that the terminal triggers periodically or if one of the predetermined conditions is satisfied;
(3) begin to receive idle-mode paging (begin CN paging monitoring & CN paging reception);
(4) begin to change and update a CN tracking area that the terminal triggers periodically or if one of the predetermined conditions is satisfied (begin updating a tracking area (TA)); and
(5) begin an attempt to establish a connection that the terminal triggers periodically or if one of the predetermined conditions is satisfied (begin sending a service request, attach request, or the like);

2. if the acceptable cell that the terminal camps on is not a cell that belongs to the same area as a power-saving-mode tracking area (RAN paging area, RAN notification area) to which the terminal previously belonged:
    (1) immediately begin to change and update a power-saving-mode tracking area that the terminal triggers (begin updating a RAN notification area and RAN tracking area):
    (1-1) if successfully performed, begin an attempt to receive power-saving-mode paging (begin RAN paging monitoring & RAN paging reception); and
    (1-2) if not successfully performed, change to an idle mode and attempt to establish an RRC connection such as updating a tracking area, sending a service request, sending an attach request, or the like, so as to connect to a network (change to a connected mode);
    (2) begin to receive idle-mode paging (begin CN paging monitoring & CN paging reception);
    (3) begin to change and update a CN tracking area that the terminal triggers periodically or if one of the predetermined conditions is satisfied (begin updating a tracking area (TA)); and
    (4) begin an attempt to establish a connection that the terminal triggers periodically or if one of the predetermined conditions is satisfied (begin sending a service request, attach request, or the like).

If the timer ("Inactive_to_Idle2") expires in operation 1123 when the terminal does not discover a suitable cell in operation 1119 and camps on the acceptable cell, the terminal may change the state to the idle mode in operation 1125. Also, the terminal may release a stored AS context.

Figure 12:
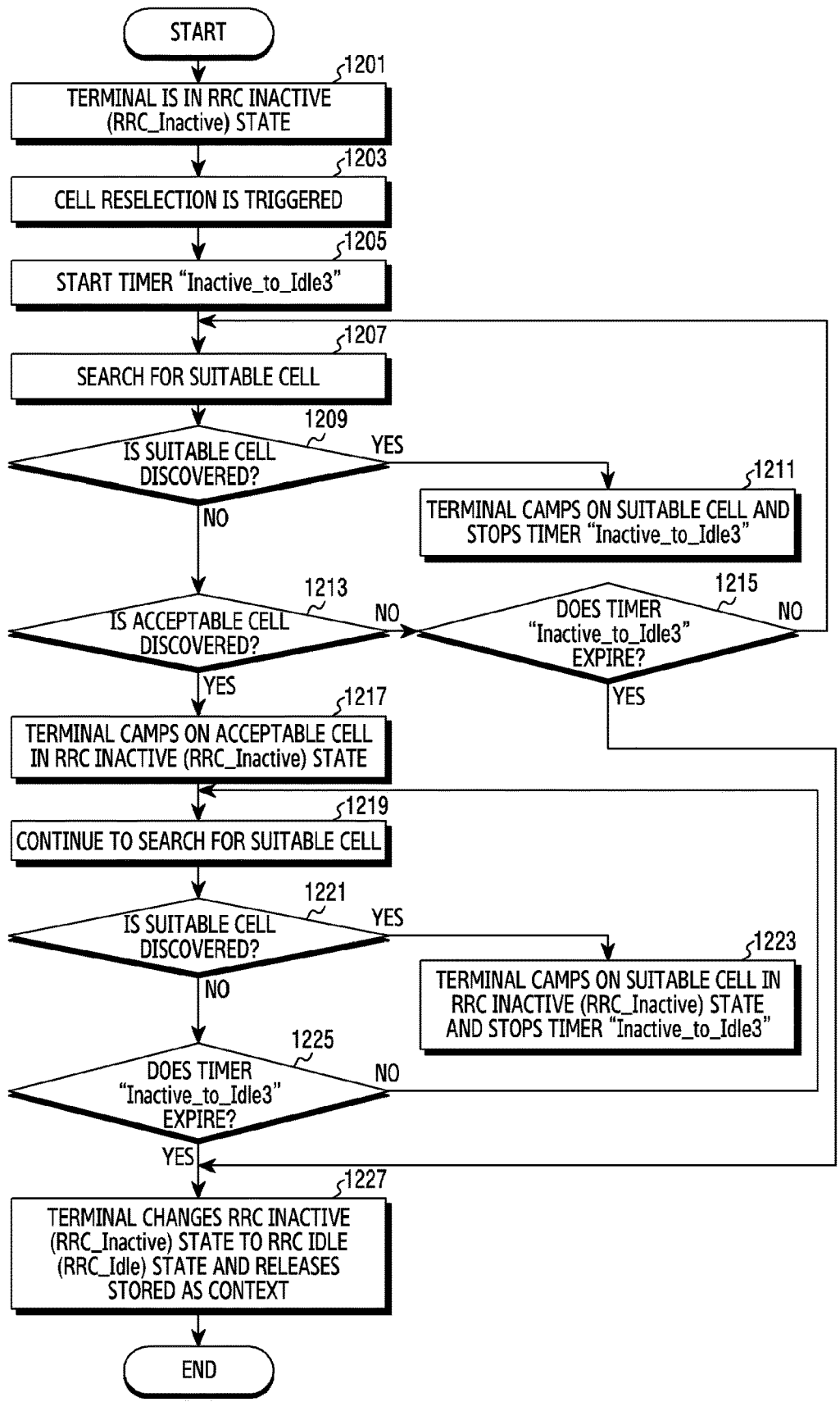
FIG. 12 is a flowchart illustrating another exemplary cell reselection process according to various embodiments of the disclosure.

FIG. 12 is a flowchart illustrating a process in which a terminal performs a cell reselection according to various embodiments.

The terminal operates in a power-saving mode in operation 1201, is triggered (starts) to perform a downlink cell reselection in operation 1203, and starts a predetermined timer ("Inactive_to_Idle3") in operation 1205. The timer ("inactive_to_idle3") is used to change the state of the terminal to an idle mode (IDLE) when the terminal searches for a suitable cell during a corresponding period of time in the power-saving mode (RRC_Inactive) and a suitable cell is not discovered.

In operation 1203, a cell reselection may begin when at least one of the following conditions is satisfied. The conditions include: a cell reselection is always performed; a cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

Subsequently, the terminal searches for a suitable cell among neighboring cells in operation 1207, and if a suitable cell is discovered in operation 1209, the terminal camps on the suitable cell in operation 1211. In this instance, the terminal may stop the timer ("Inactive_to_Idle3") and initialize the same.

If the terminal does not discover a suitable cell among the neighboring cells in operation 1209, and also does not discover an acceptable cell in operation 1213, and the timer ("Inactive_to_Idle3") expires in operation 1215 in the state in which the terminal continuously searches for a suitable cell and an acceptable cell in operation 1213, the terminal may change the state to the idle mode in operation 1227. Also, the terminal may release a stored AS context.

When an acceptable cell is discovered in operation 1213, the terminal may camp on the corresponding acceptable cell in the state of maintaining the power-saving mode in operation 1217. In this instance, the terminal continuously searches for a suitable cell in operation 1219, and if a suitable cell is discovered in operation 1221, the terminal may quickly perform reconnection using the AS context that the terminal maintains in operation 1223, which is advantageous.

As for an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:

1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, attach request, or the like).

While the terminal camps on the acceptable cell in the state of maintaining the power-saving mode in operation 1217, the terminal continuously searches for a suitable cell in operation 1219. If a suitable cell is discovered in operation 1221, the terminal may camp on the suitable cell in operation 1223. In this instance, the terminal may initialize the timer ("Inactive_to_Idle3"). If the timer ("Inactive_to_Idle3") expires in operation 1225 when the terminal does not discover a suitable cell in operation 1221 and camps on an acceptable cell, the terminal may change the state to the idle mode in operation 1227. Also, the terminal may release a stored AS context.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:

1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception); and
   (2) begin to change and update a power-saving-mode tracking area that the terminal triggers periodically or if one of the predetermined conditions is satisfied (begin updating a RAN notification area and RAN tracking area);
   (3) begin to receive idle-mode paging (begin CN paging monitoring & CN paging reception);
   (4) begin to change and update a CN tracking area that the terminal triggers periodically or if one of the predetermined conditions is satisfied (begin updating a tracking area (TA)); and
   (5) begin an attempt to establish a connection that the terminal triggers periodically or if one of the predetermined conditions is satisfied (begin sending a service request, attach request, or the like);
2. if the acceptable cell that the terminal camps on is not a cell that belongs to the same area as a power-saving-mode tracking area (RAN paging area, RAN notification area) to which the terminal previously belonged:
   (1) immediately begin to change and update a power-saving-mode tracking area that the terminal triggers (begin updating a RAN notification area and RAN tracking area):
   (1-1) if successfully performed, begin an attempt to receive power-saving-mode paging (begin RAN paging monitoring & RAN paging reception); and
   (1-2) if not successfully performed, change to an idle mode and attempt to establish an RRC connection such as updating a tracking area, sending a service request, sending an attach request, or the like, so as to connect to a network (change to a connected mode);
   (2) begin to receive idle-mode paging (begin CN paging monitoring & CN paging reception);
   (3) begin to change and update a CN tracking area that the terminal triggers periodically or if one of the predetermined conditions is satisfied (begin updating a tracking area (TA)); and
   (4) begin an attempt to establish a connection that the terminal triggers periodically or if one of the predetermined conditions is satisfied (begin sending a service request, attach request, or the like).

If the terminal does not discover a suitable cell in operation 1219 and camps on the acceptable cell, and the timer ("Inactive_to_Idle3") expires in operation 1225 in the state in which the terminal does not discover a suitable cell in operation 1221 and camps on the acceptable cell, the terminal may change the state to the idle mode in operation 1225. Also, the terminal may release a stored AS context.

Figure 13:
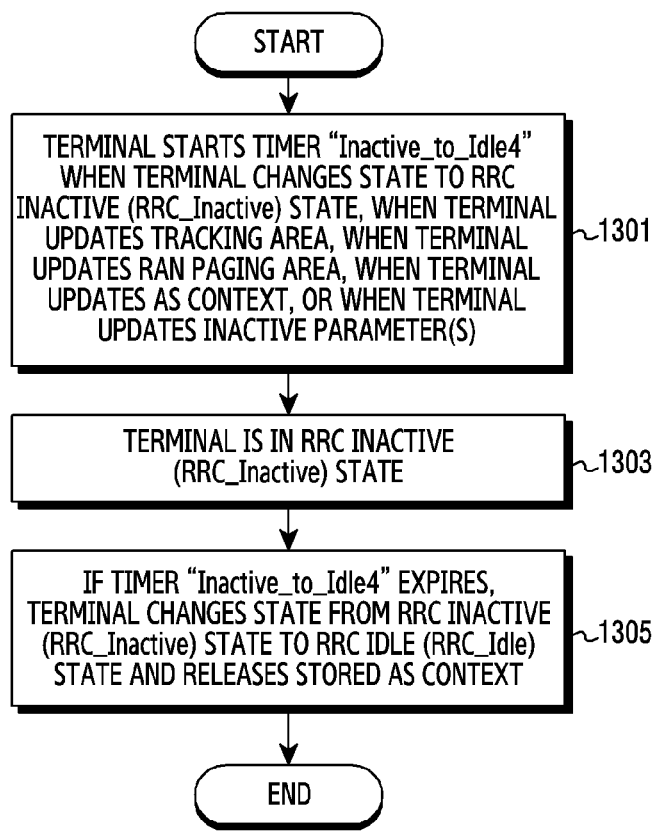
FIG. 13 is a diagram illustrating an exemplary process in which a terminal performs a state transition in a wireless communication system according to various embodiments of the disclosure.

FIG. 13 is a diagram illustrating a process in which a terminal performs state transition in a wireless communication system according to various embodiments.

In operation 1301, the terminal may start a predetermined timer ("Inactive_to_Idle4") if the terminal satisfies one or more of the following conditions:
1. the state of the terminal is changed to a power-saving mode (i.e. RRC_INACTIVE) state;
2. the terminal updates a tracking area;
3. the terminal transmits a service request;
4. the terminal transmits an attach request;
5. The terminal performs updating of a RAN paging area; and
6. the terminal updates an AS context.

The timer ("Inactive_to_Idle4") indicates an effective period of the AS context that the terminal maintains during a corresponding period of time when the terminal changes to the power-saving mode (RRC_Inactive). The timer is used to change the state to the idle mode since the terminal is aware that the AS context is not effective any longer if the timer expires.

Subsequently, while the terminal operates in the power-saving mode (RRC_Inactive state) in operation 1303, if the timer ("Inactive_to_Idle4") expires in operation 1305, the terminal may change the state to the idle mode. Also, the terminal may release a stored AS context.

Figure 14:
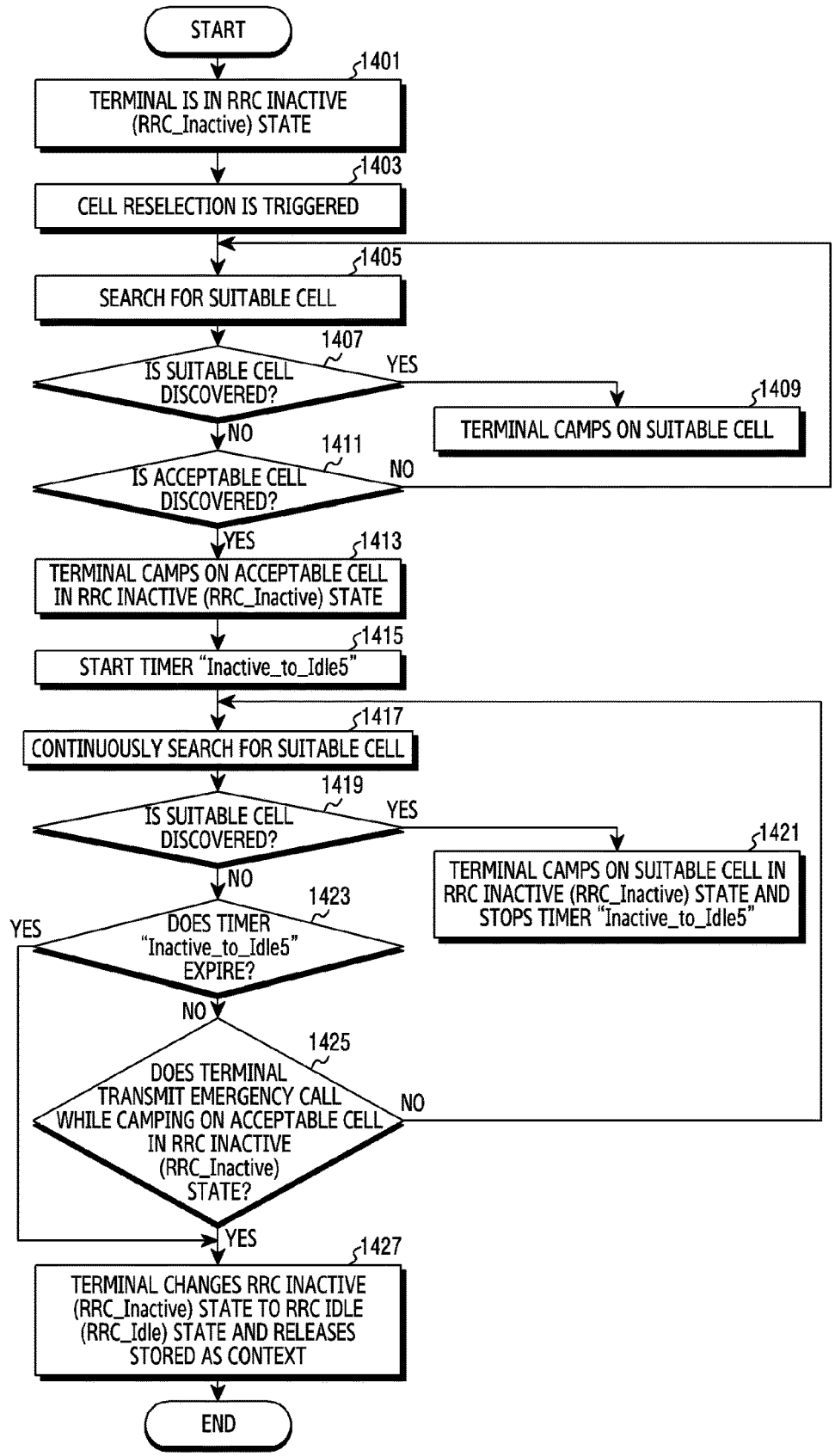
FIG. 14 is a flowchart illustrating another process in which a terminal performs cell reselection according to various embodiments of the disclosure.

FIG. 14 is a flowchart illustrating a process in which a terminal performs a cell reselection according to various embodiments.

The terminal operates in a power-saving mode in operation 1401, is triggered (starts) to perform a downlink cell reselection in operation 1403, and searches for a suitable cell among neighboring cells in operation 1405. If no suitable cell is discovered among the neighboring cells in operation 1407 and an acceptable cell is discovered in operation 1411, the terminal may camp on the acceptable cell in the state of maintaining the power-saving mode in operation 1413. If a suitable cell is discovered among the neighboring cells in operation 1407, the terminal may camp on the suitable cell in operation 1409.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and 5. suspend an attempt to establish a connection that the terminal triggers periodically or if one of the predetermined conditions is satisfied (suspend sending a service request, attach request, or the like).

In operation 1403, a cell reselection may begin when at least one of the following conditions is satisfied. The conditions include: a cell reselection is always performed; cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. The terminal may start a predetermined time ("inactive_to_Idle5") in operation 1415 immediately before, at the same time as, or immediately after the terminal camps on the acceptable cell in operation 1413. The timer ("inactive_to_idle5") is used to change the state of the terminal to an idle mode (IDLE) when the terminal searches for a suitable cell in the power-saving mode (RRC_Inactive) during a corresponding period of time and a suitable cell is not discovered in the case in which the terminal camps on the acceptable cell in the power-saving mode (RRC_Inactive). While the terminal camps on the acceptable cell in the state of maintaining the power-saving mode, the terminal continuously searches for a suitable cell in operation 1417. If a suitable cell is discovered in operation 1419, the terminal may camp on the suitable cell in operation 1421. In this instance, the terminal may stop the timer ("Inactive_to_Idle5"), and initialize the same.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception); and
   (2) begin to change and update a power-saving-mode tracking area that the terminal triggers periodically or if one of the predetermined conditions is satisfied (begin to update a RAN notification area and RAN tracking area);
   (3) begin to receive idle-mode paging (begin CN paging monitoring & CN paging reception);
   (4) begin to change and update a CN tracking area that the terminal triggers periodically or if one of the predetermined conditions is satisfied (begin updating a tracking area (TA)); and
   (5) begin an attempt to establish a connection that the terminal triggers periodically or if one of the predetermined conditions is satisfied (begin sending a service request, attach request, or the like);
2. if the acceptable cell that the terminal camps on is not a cell that belongs to the same area as a power-saving-mode tracking area (RAN paging area, RAN notification area) to which the terminal previously belonged:
   (1) immediately begin to change and update a power-saving-mode tracking area that the terminal triggers (begin updating a RAN notification area and RAN tracking area):
   (1-1) if successfully performed, begin an attempt to receive power-saving-mode paging (begin RAN paging monitoring & RAN paging reception); and
   (1-2) if not successfully performed, change to an idle mode and attempt to establish an RRC connection such as updating a tracking area, sending a service request, sending an attach request, or the like, so as to connect to a network (change to connected mode);
   (2) begin to receive idle-mode paging (begin CN paging monitoring & CN paging reception);
   (3) begin to change and update a CN tracking area that the terminal triggers periodically or if one of the predetermined conditions is satisfied (begin updating a tracking area (TA)); and
   (4) begin an attempt to establish a connection that the terminal triggers periodically or if one of the predetermined conditions is satisfied (begin sending a service request, attach request, or the like).

If the timer ("Inactive_to_Idle5") expires in operation 1423 when the terminal does not discover a suitable cell in operation 1419 and camps on the acceptable cell, the terminal may change the state to the idle mode. If the timer ("inactive_to_Idle5") does not expire when the terminal does not discover a suitable cell and camps on the acceptable cell, and the terminal needs to transmit an emergency call in operation 1425, the terminal may change the state to the idle mode and may transmit an emergency call using the acceptable cell in operation 1427. Also, the terminal may release a stored AS context.

Figure 15:
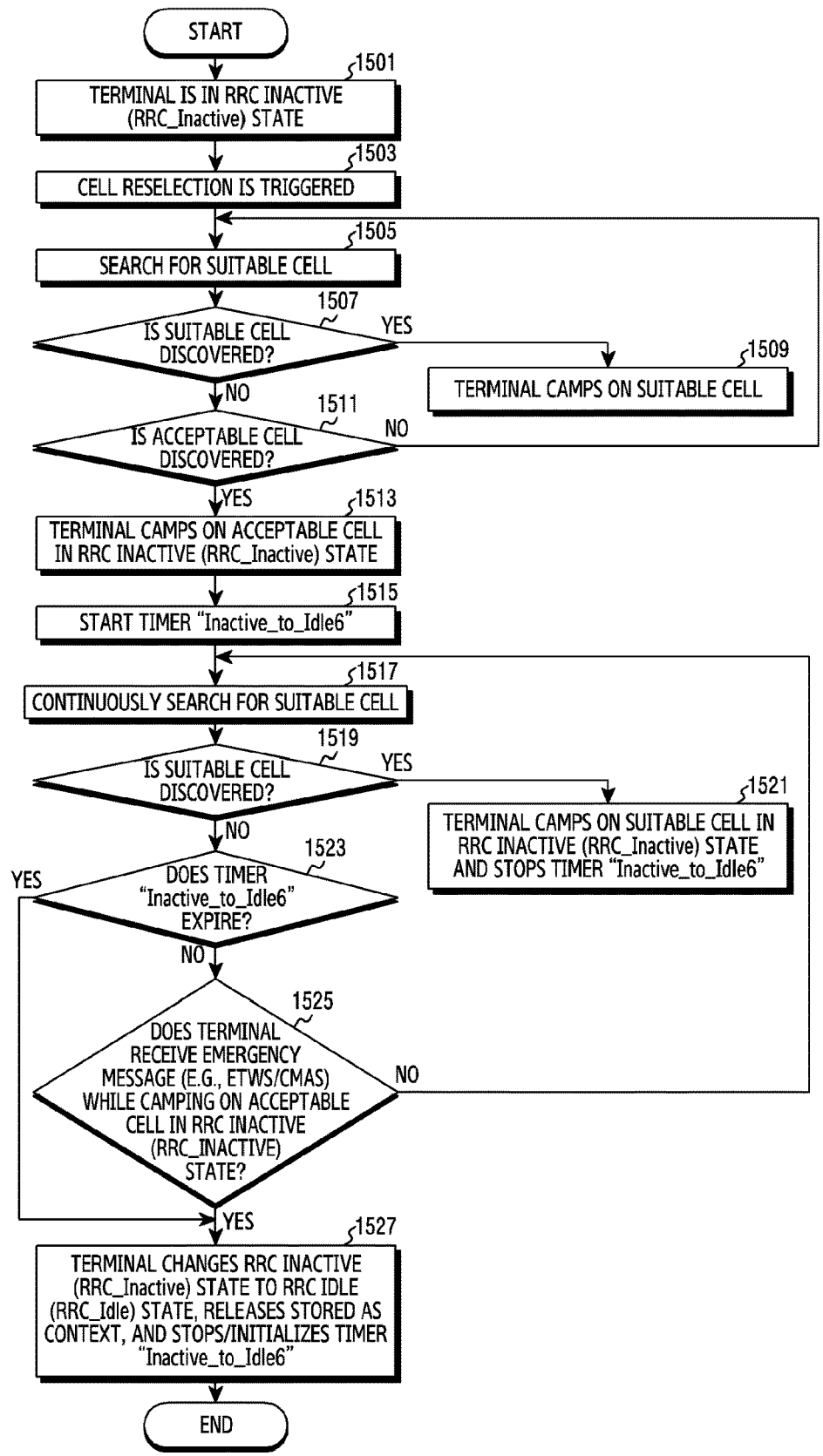
FIG. 15 is a flowchart illustrating another exemplary cell reselection process according to various embodiments of the disclosure.

FIG. 15 is a flowchart illustrating a process in which a terminal performs a cell reselection according to various embodiments.

The terminal operates in a power-saving mode in operation 1501, is triggered (starts) to perform a downlink cell reselection in operation 1503, and searches for a suitable cell among neighboring cells in operation 1505. If no suitable cell is discovered among the neighboring cells in operation 1507 and an acceptable cell is discovered in operation 1511, the terminal may camp on the acceptable cell in the state of maintaining the power-saving mode in operation 1513. If a suitable cell is discovered among the neighboring cells in operation 1507, the terminal may camp on the suitable cell in operation 1509.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, attach request, or the like).

In operation 1503, a cell reselection may begin when at least one of the following conditions is satisfied. The conditions include: a cell reselection is always performed; cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. The terminal may start a predetermined timer ("inactive_to_Idle6") in operation 1515 immediately before, at the same time as, or immediately after the terminal camps on an acceptable cell in operation 1513. The timer ("inactive_to_idle6") is used to change the state of the terminal to an idle mode (IDLE) when the terminal searches for a suitable cell during a corresponding period of time and a suitable cell is not discovered, in the case in which the terminal camps on the acceptable cell in the power-saving mode (RRC_Inactive) state during the corresponding period of time. While the terminal camps on the acceptable cell in the state of maintaining the power-saving mode, the terminal continuously searches for a suitable cell in operation 1517. If a suitable cell is discovered in operation 1519, the terminal may camp on the suitable cell in operation 1521. In this instance, the terminal may stop the timer ("Inactive_to_Idle6") and initialize the same.

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception); and
   (2) begin to change and update a power-saving-mode tracking area that the terminal triggers periodically or if one of the predetermined conditions is satisfied (begin to update a RAN notification area and RAN tracking area);
   (3) begin receiving idle-mode paging (begin CN paging monitoring & CN paging reception);
   (4) begin to change and update a CN tracking area that the terminal triggers periodically or if one of the predetermined conditions is satisfied (begin updating a tracking area (TA)); and
   (5) begin an attempt to establish a connection that the terminal triggers periodically or if one of the predetermined conditions is satisfied (begin sending a service request, attach request, or the like);
2. if the acceptable cell that the terminal camps on is not a cell that belongs to the same area as a power-saving-mode tracking area (RAN paging area, RAN notification area) to which the terminal previously belonged:
   (1) immediately begin to change and update a power-saving-mode tracking area that the terminal triggers (begin to update a RAN notification area and RAN tracking area):
   (1-1) if successfully performed, begin an attempt to receive power-saving-mode paging (begin RAN paging monitoring & RAN paging reception); and
   (1-2) if not successfully performed, change to an idle mode and attempt to establish an RRC connection, such as updating a tracking area, sending a service request, sending an attach request, or the like, so as to connect to a network (change to a connected mode);
   (2) begin to receive idle-mode paging (begin CN paging monitoring & CN paging reception);
   (3) begin to change and update a CN tracking area that the terminal triggers periodically or if one of the predetermined conditions is satisfied (begin updating a tracking area (TA)); and
   (4) begin an attempt to establish a connection that the terminal triggers periodically or if one of the predetermined conditions is satisfied (begin sending a service request, attach request, or the like).

If the timer ("Inactive_to_Idle6") expires in operation 1523 when the terminal does not discover a suitable cell in operation 1519 and camps on the acceptable cell, the terminal may change the state to the idle mode. If the timer ("inactive_to_Idle6") does not expire when the terminal does not discover a suitable cell and camps on the acceptable cell, and the terminal receives an emergency/disaster message (e.g., ETWS/CMAS) from the network in operation 1525, the terminal may change the state to the idle mode in operation 1527. In the case in which an emergency/disaster message is received, making an emergency call is expected after a user checks the message. Accordingly, the terminal performs state transition by expecting that an emergency call is to be made in the future. Also, the terminal may release a stored AS context. In this instance, the terminal may stop the timer ("Inactive_to_Idle6") and initialize the same.

Figure 16:
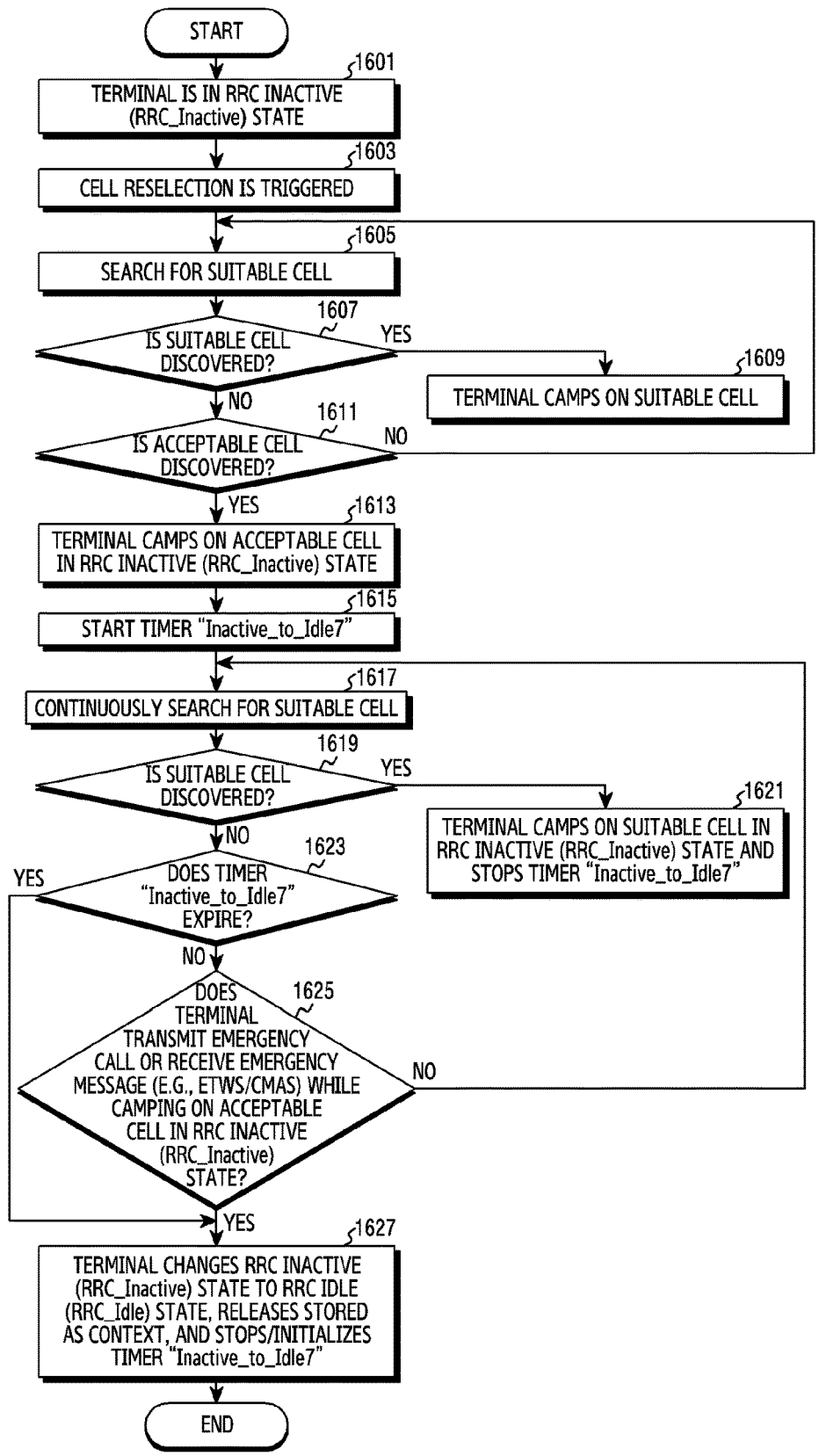
FIG. 16 is a flowchart illustrating another exemplary cell reselection process according to various embodiments of the disclosure.

FIG. 16 is a flowchart illustrating a process in which a terminal performs a cell reselection according to various embodiments.

The terminal operates in a power-saving mode in operation 1601, is triggered (starts) to perform a downlink cell reselection in operation 1603, and searches for a suitable cell among neighboring cells in operation 1605. If no suitable cell is discovered among the neighboring cells in operation 1607 and an acceptable cell is discovered in operation 1611, the terminal may camp on the acceptable cell in the state of maintaining the power-saving mode in operation 1613. If a suitable cell is discovered among the neighboring cells in operation 1607, the terminal may camp on the suitable cell in operation 1609.

In the case of an acceptable cell, the terminal may discover an acceptable cell while searching for a suitable cell. Alternatively, if the terminal fails to discover a suitable cell, the terminal may separately execute a search for an acceptable cell.

If the terminal camps on the acceptable cell in the state of maintaining the power-saving mode (inactive), the terminal may need to suspend some of the operations that the terminal performs in the power-saving mode. Some or all of the operations that the terminal suspends are as follows:
1. suspend an attempt to receive power-saving-mode paging (suspend RAN paging monitoring & RAN paging reception);
2. suspend changing and updating of a power-saving-mode tracking area that the terminal triggers periodically or if one of the predetermined conditions is satisfied (suspend updating of a RAN notification area and RAN tracking area);
3. suspend an attempt to receive idle-mode paging (suspend CN paging monitoring & CN paging reception);
4. suspend changing and updating of a CN tracking area that the terminal triggers periodically or if one of the predetermined conditions is satisfied (suspend updating of a tracking area (TA)); and
5. suspend an attempt to establish a connection that the terminal triggers periodically or if one of the predetermined conditions is satisfied (suspend sending a service request, attach request, or the like).

In operation 1603, a cell reselection may begin when at least one of the following conditions is satisfied. The conditions include: a cell reselection is always performed; cell reselection is performed periodically; the measured cell and channel quality value of a serving cell decreases to be less than or equal to a predetermined threshold value (below a threshold, not satisfying S-criteria); the measured cell and channel quality value of a neighboring cell increases to be greater than or equal to a threshold value (above a threshold); the measured cell and channel quality value of a serving cell relatively decreases by at least a predetermined numeric value/predetermined ratio, compared to the measured cell and channel quality value of a neighboring cell (the channel quality value of a target cell–the channel quality value of a serving cell>predetermined threshold value); a hypothetical PDCCH failure increases by at least a predetermined threshold value (above a threshold); a successful transmission rate decreases (failure rate increases); or the like.

In this instance, if a suitable cell is discovered in the future, the terminal is capable of quickly performing reconnection using the AS context that the terminal maintains, which is advantageous. The terminal may start a predetermined time ("inactive_to_Idle7") in operation 1615 immediately before, at the same time as, or immediately after the terminal camps on the acceptable cell in operation 1613. The timer ("inactive_to_idle7") is used to change the state of the terminal to an idle mode (IDLE) when the terminal searches for a suitable cell during a corresponding period of time and a suitable cell is not discovered in the case in which the terminal camps on the acceptable cell in the power-saving mode (RRC_Inactive) state during the corresponding period of time. While the terminal camps on the acceptable cell in the state of maintaining the power-saving mode, the terminal continuously searches for a suitable cell in operation 1617. If a suitable cell is discovered in operation 1619, the terminal may camp on the suitable cell in operation 1621. In this instance, the terminal may initialize the timer ("Inactive_to_Idle7").

While the terminal camps on the acceptable cell in the state of maintaining the power-saving mode (inactive), if the terminal discovers a suitable cell, the terminal may camp on the suitable cell. In this instance, the terminal may need to begin, again, some or all of the operations that the terminal has suspended since the terminal camped on the acceptable cell in the state of maintaining the power-saving mode. Some or all of the operations that the terminal suspends are as follows:
1. if the acceptable cell that the terminal camps on is one of the cells that belong to the same area as a power-saving-mode tracking area (RAN paging area, RAN notification area) to which the terminal previously belonged:
   (1) begin an attempt to receive power-saving-mode paging (begin RAN paging monitoring & RAN paging reception); and
   (2) begin to change and update a power-saving-mode tracking area that the terminal triggers periodically or if one of the predetermined conditions is satisfied (begin updating a RAN notification area and RAN tracking area);
   (3) begin to receive idle-mode paging (begin CN paging monitoring & CN paging reception);
   (4) begin to change and update a CN tracking area that the terminal triggers periodically or if one of the predetermined conditions is satisfied (begin updating a tracking area (TA)); and
   (5) begin an attempt to establish a connection that the terminal triggers periodically or if one of the predetermined conditions is satisfied (begin sending a service request, attach request, or the like);
2. if the acceptable cell that the terminal camps on is not a cell that belongs to the same area as a power-saving-mode tracking area (RAN paging area and RAN notification area) to which the terminal previously belonged:
   (1) immediately begin to change and update a power-saving-mode tracking area that the terminal triggers (begin updating a RAN notification area and RAN tracking area):
   (1-1) if successfully performed, begin an attempt to receive power-saving-mode paging (begin RAN paging monitoring & RAN paging reception); and
   (1-2) if not successfully performed, change to an idle mode and attempt to establish an RRC connection such as updating a tracking area, sending a service request, sending an attach request, or the like, so as to connect to a network (change to connected mode);
   (2) begin to receive idle-mode paging (begin CN paging monitoring & CN paging reception);
   (3) begin to change and update a CN tracking area that the terminal triggers periodically or if one of the predetermined conditions is satisfied (begin updating a tracking area (TA)); and (4) begin an attempt to establish a connection that the terminal triggers periodically or if one of the predetermined conditions is satisfied (begin sending a service request, attach request, or the like).

If the timer ("Inactive_to_Idle7") expires in operation 1623 when the terminal does not discover a suitable cell in operation 1619 and camps on the acceptable cell, the terminal may change the state to the idle mode. If the timer ("inactive_to_Idle7") does not expire when the terminal does not discover a suitable cell and camps on the acceptable cell, and the terminal needs to transmit an emergency call or receives an emergency/disaster message (e.g., ETWS/CMAS) from the network in operation 1625, the terminal may change the state to the idle mode in operation 1627. In the case in which an emergency/disaster message is received, making an emergency call is expected after a user checks the message. Accordingly, the terminal performs state transition by expecting that an emergency call is to be made in the future. Also, the terminal may release a stored AS context. In this instance, the terminal may stop the timer ("Inactive_to_Idle7") and initialize the same.

Figure 17:
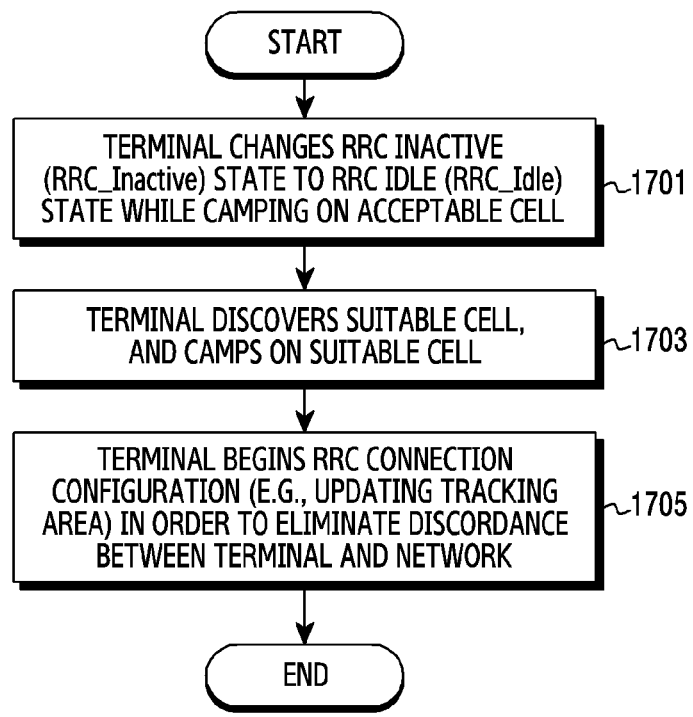
FIG. 17 is a flowchart illustrating a process in which a terminal performs RRC connection configuration according to various embodiments of the disclosure.

FIG. 17 is a flowchart illustrating a process in which a terminal performs RRC connection configuration according to various embodiments.

In operation 1701, the terminal, which camps on an acceptable cell and operates in a power-saving mode, may change the state to an idle mode according to a condition. When the terminal changes an inactive state (RRC_Inactive) to an idle state (RRC_Idle) in operation 1701, the terminal may internally turn on an indicator or a parameter, for example, "Inactive_to_Idle_Indicator".

Subsequently, when the terminal discovers a suitable cell, the terminal may camp on the suitable cell in operation 1703. In this instance, although the terminal changes from the power-saving mode to the idle mode, the network is not aware of the state transition of the terminal. Accordingly, the terminal may check "Inactive_to_Idle_Indicator", and if the corresponding indicator is turned on, the terminal may attempt to establish an RRC connection, such as updating a tracking area, sending a service request, sending an attach request, or the like, and may connect to the network in order to eliminate discordance of information between the terminal and the network. That is, the terminal may begin RRC connection configuration. Also, in operation 1705, the terminal may turn off "Inactive_to_Idle_Indicator".

Figure 18:
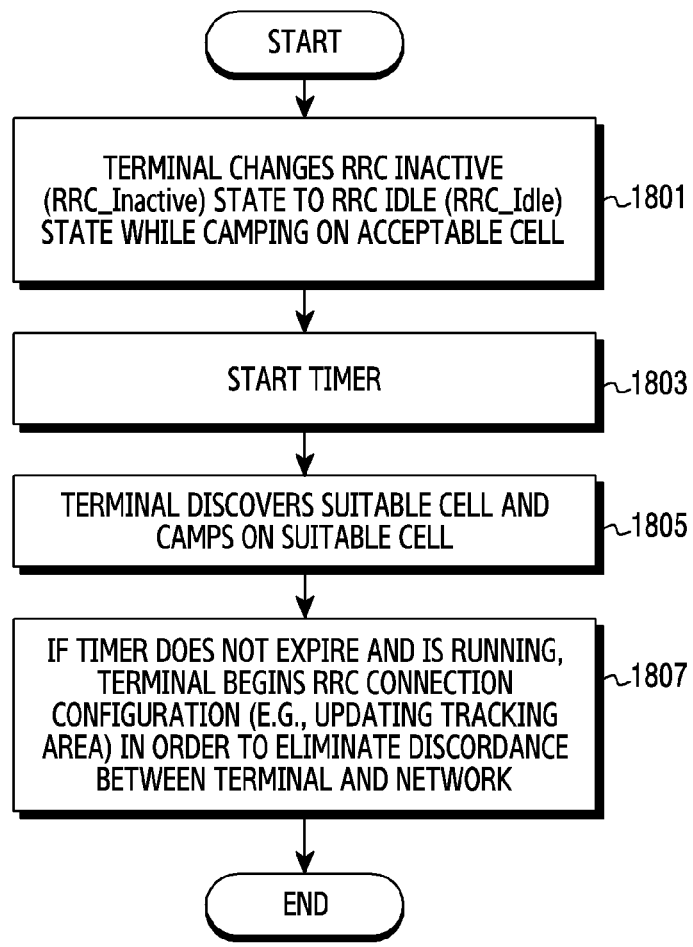
FIG. 18 is a flowchart illustrating a process in which a terminal performs RRC connection configuration according to various embodiments of the disclosure.

FIG. 18 is a flowchart illustrating a process in which a terminal performs RRC connection configuration according to various embodiments.

The terminal, which camps on an acceptable cell and operates in a power-saving mode, may change the state to an idle mode according to a condition in operation 1801. In this instance, the terminal may start a predetermined timer in operation 1803. The timer indicates an effective period of the AS context that the terminal maintains during a corresponding period of time when the terminal changes to the power-saving mode (RRC_Inactive). The timer is used so that the terminal is aware that the AS context is not effective any longer if the timer expires.

Subsequently, when the terminal discovers a suitable cell, the terminal may camp on the suitable cell in operation 1805. In this instance, if the running timer does not expire and is still running, although the terminal changes from the power-saving mode to the idle mode, the network is not aware of the state transition of the terminal, and thus the terminal may attempt to establish an RRC connection such as updating a tracking area, sending a service request, or a sending an attach request, and may connect to the network in order to eliminate discordance of information between the terminal and the network in operation 1805. That is, the terminal may begin RRC connection configuration.

Figure 19:
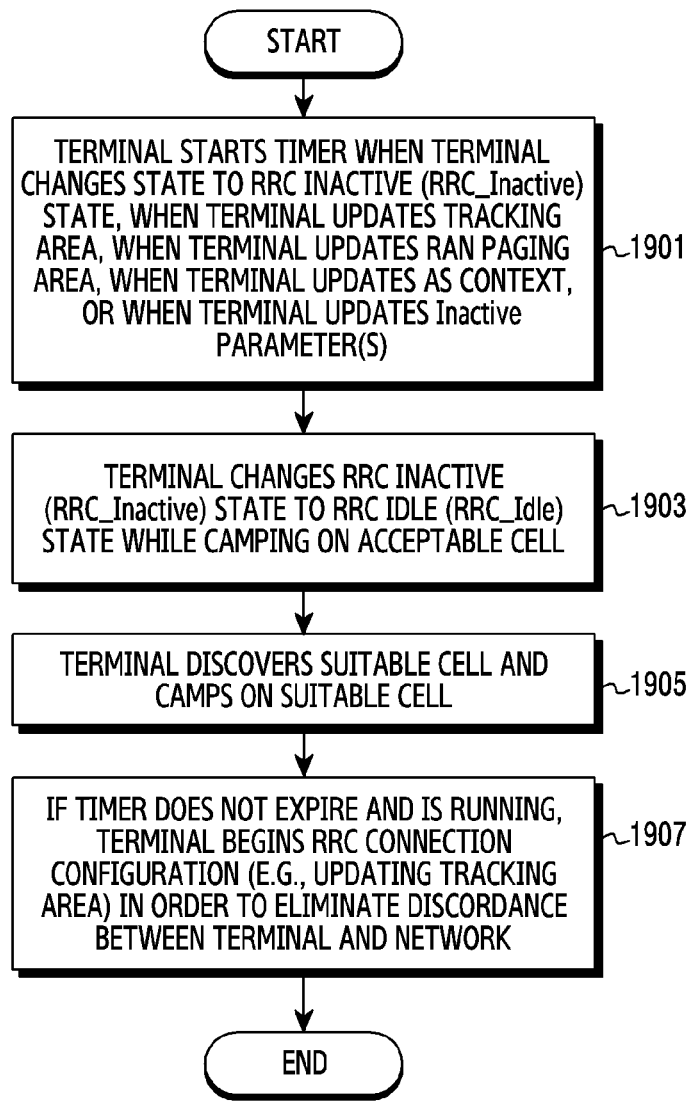
FIG. 19 is a flowchart illustrating a process in which a terminal performs RRC connection configuration according to various embodiments of the disclosure.

FIG. 19 is a flowchart illustrating a process in which a terminal performs RRC connection configuration according to various embodiments.

In operation 1901, the terminal may start a timer if the terminal satisfies one or more of the following conditions:
1. the terminal is changed to a power-saving mode (i.e. RRC_INACTIVE) state;
2. the terminal updates a tracking area;
3. the terminal transmits a service request;
4. the terminal transmits an attach request;
5. the terminal updates a RAN paging area;
6. the terminal updates an AS context; and
7. the terminal updates an inactive parameter.

After the timer starts, the terminal, which camps on the acceptable cell and operates in a power-saving mode, may change the state to an idle mode according to a condition in operation 1903. Subsequently, if the terminal discovers a suitable cell, the terminal may camp on the suitable cell in operation 1905. In this instance, in the case in which the running timer does not expire and is still running, although the terminal changes from the power-saving mode to the idle mode, the network is not aware of the state transition of the terminal, and thus the terminal may attempt to establish an RRC connection such as updating a tracking area, sending a service request, or a sending an attach request, and may connect to the network in order to eliminate discordance of information between the terminal and the network in operation 1907. That is, the terminal may begin RRC connection configuration.

Methods according to embodiments stated in claims and/or specifications of the disclosure may be implemented as hardware, software, or a combination of hardware and software.

When the methods are implemented as software, a computer-readable storage medium for storing one or more programs (software modules) may be provided. The one or more programs stored in the computer-readable storage medium may be configured for execution by one or more processors within the electronic device. The at least one program may include instructions that enable the electronic device to perform the methods according to various embodiments of the disclosure defined in the appended claims and/or disclosed herein.

The programs (software modules or software) may be stored in nonvolatile memory including random access memory and flash memory, read-only memory (ROM), electrically erasable programmable read-only memory (EEPROM), a magnetic disc storage device, a compact disc-ROM (CD-ROM), digital versatile discs (DVDs), or other types of optical storage devices, or a magnetic cassette. Alternatively, the programs may be stored in memory configured to include a combination of some or all of the above. Further, a plurality of such memories may be included.

In addition, the programs may be stored in an attachable storage device which is accessible via communication networks such as the Internet, Intranet, a local area network (LAN), a wide area network (WAN), and a storage area network (SAN), or a combination thereof. Such a storage device may access a device which performs embodiments of the disclosure via an external port. Further, a separate storage device on a communication network may access a device that performs embodiments of the disclosure.

In the above-described detailed embodiments of the disclosure, an element included in the disclosure is expressed in the singular form or the plural form according to detailed described embodiments of the disclosure. However, the singular form or plural form is selected for convenience of description suitable for the given situation, and various embodiments of the disclosure are not limited to a single element or multiple elements thereof. Further, multiple elements expressed in the description may be configured into a single element, or alternatively, a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the disclosure has been described with various embodiments, various changes and modifications may be suggested to one skilled in the art. It is intended that the disclosure encompass such changes and modifications as fall within the scope of the appended claims.

What is claimed is:

1. A method performed by a terminal in a wireless communication system, the method comprising:
   determining to initiate a cell reselection in a radio resource control (RRC) inactive state;
   searching for a suitable cell for a normal service, wherein the suitable cell satisfies a first condition associated with a cell quality and a second condition associated with a service provider of a cell;
   when the suitable cell is identified, camping on the suitable cell;
   when the suitable cell is not identified, camping on an acceptable cell for a limited service in the RRC inactive state and starting a timer, wherein the acceptable cell satisfies the first condition; and
   based on identifying that the terminal performs the limited service on the acceptable cell while the timer is running, changing a state of the terminal from the RRC inactive state to a RRC idle state.

2. The method of claim 1, wherein the first condition is that the cell quality is greater than or equal to a predetermined value, and the second condition is that the service provider of the cell is a same as a service provider with which the terminal is registered.

3. The method of claim 1, further comprising:
   while camping on the acceptable cell in the RRC inactive state, searching for the suitable cell; and
   when the timer is expired, changing the state of the terminal to the RRC idle state, when the suitable cell is identified before the timer is expired, camping on the suitable cell and stopping the timer.

4. The method of claim 1, wherein the changing the state of the terminal further comprises:
   releasing an access stratum (AS) context, wherein the AS context is maintained while the state of the terminal is in the RRC inactive state.

5. The method of claim 1, wherein the cell reselection is initiated:
   when a quality value of a serving cell of the terminal is less than or equal to a predetermined threshold value;
   when a quality value of one of a plurality of neighboring cells is greater than or equal to a predetermined value; or
   when a difference between the quality value of the serving cell of the terminal and the quality value of one of the plurality of neighboring cells is greater than or equal to a second predetermined threshold value.

6. The method of claim 1, further comprising:
   wherein the limited service comprises at least one of an emergency call, earthquake and tsunami warning system (ETWS) notification, or commercial mobile alert system (CMAS) notification.

7. The method of claim 6, wherein the changing the state of the terminal comprises:
   identifying that the terminal needs to transmit an emergency call while camping on the acceptable cell in the RRC inactive state.

8. The method of claim 6, wherein changing of state of the terminal comprises:
   identifying that the terminal receives an earthquake and tsunami warning system (ETWS), or commercial mobile alert system (CMAS) notification while camping on the acceptable cell in the RRC inactive state.

9. The method of claim 1, further comprising:
   stopping at least one of a predetermined plurality of operations while camping on the acceptable cell in the RRC inactive state.

10. The method of claim 9, further comprising:
    while camping on the acceptable cell in the RRC inactive state, searching for the suitable cell;
    when the suitable cell is identified, camping on the suitable cell; and
    performing the at least one of the predetermined plurality of operations.

11. The method of claim 9, wherein the predetermined plurality of operations comprises at least one of: a paging reception, a tracking area update, a service request, or an attach request.

12. A terminal in a wireless communication system, the terminal comprising:
    at least one transceiver; and
    at least one processor configured to:
       determine to initiate a cell reselection in a radio resource control (RRC) inactive state;
       search for a suitable cell for a normal service, wherein the suitable cell satisfies a first condition associated with a cell quality and a second condition associated with a service provider of a cell;
       when the suitable cell is identified, camp on the suitable cell;
       when the suitable cell is not identified, camp on an acceptable cell for a limited service in the RRC inactive state and start a timer, wherein the acceptable cell satisfies the first condition; and
       based on identifying that the terminal performs the limited service on the acceptable cell while the timer is running, change a state of the terminal from the RRC inactive state to a RRC idle state.

13. The terminal of claim 11, wherein the first condition is that the cell quality is greater than or equal to a predetermined value, and the second condition is that the service provider of the cell is a same as a service provider with which the terminal is registered.

14. The terminal of claim 12, wherein the at least one processor is further configured to:
    while camping on the acceptable cell in the RRC inactive state, search for the suitable cell; and
    when the timer is expired, change the state of the terminal to the RRC idle state,
    when the suitable cell is identified before the timer is expired, camp on the suitable cell and stop the timer.

15. The terminal of claim 12, wherein the at least one processor is further configured to:
  release an access stratum (AS) context, wherein the AS context is maintained while the state of the terminal is the RRC inactive state.

16. The terminal of claim 12, wherein the at least one processor is further configured to determine to initiate the cell reselection:
  when a quality value of a serving cell of the terminal is less than or equal to a predetermined threshold value;
  when a quality value of one of a plurality of neighboring cells is greater than or equal to a threshold value; or
  when a difference between the quality value of the serving cell of the terminal and the quality value of one of the plurality of neighboring cells is greater than or equal to a second predetermined threshold value.

17. The terminal of claim 12,
  wherein the limited service comprises at least one of an emergency call, earthquake and tsunami warning system (ETWS) notification, or commercial mobile alert system (CMAS) notification.

18. The terminal of claim 17, wherein the at least one processor is, to change the state of the terminal, further configured to:
  identify that the terminal needs to transmit an emergency call while camping on the acceptable cell in the RRC inactive state.

19. The terminal of claim 17, wherein the at least one processor is, to change the state of the terminal, further configured to:
  identify that the terminal receives an earthquake and tsunami warning system (ETWS), or commercial mobile alert system (CMAS) notification while camping on the acceptable cell in the RRC inactive state.

20. The terminal of claim 11, wherein the at least one processor is further configured to:
  stop at least one of a predetermined plurality of operations while camping on the acceptable cell in the RRC inactive state.

21. The terminal of claim 20, wherein the at least one processor is further configured to:
  while camping on the acceptable cell in the RRC inactive state, search for the suitable cell;
  when the suitable cell is identified, camp on the suitable cell; and
  perform the at least one of the predetermined plurality of operations.

22. The terminal of claim 20,
  wherein the predetermined plurality of operations comprises at least one of: a paging reception, a tracking area update, a service request, or an attach request.

* * * * *